US00RE40373E

(19) United States
(12) Reissued Patent
Heno

(10) Patent Number: US RE40,373 E
(45) Date of Reissued Patent: Jun. 10, 2008

(54) CARD CLEANING DEVICE

(75) Inventor: Gaetan Heno, Ancenis (FR)

(73) Assignee: ZIH Corp., Wilmington, DE (US)

(21) Appl. No.: 10/689,580

(22) Filed: Oct. 20, 2003

Related U.S. Patent Documents

Reissue of:
(64) Patent No.: 6,408,151
Issued: Jun. 18, 2002
Appl. No.: 10/010,222
Filed: Dec. 6, 2001

U.S. Applications:
(63) Continuation of application No. 09/822,692, filed on Mar. 30, 2001, now abandoned, which is a continuation-in-part of application No. 09/483,624, filed on Jan. 13, 2000, now Pat. No. 6,285,845.
(60) Provisional application No. 60/133,578, filed on May 11, 1999.

(51) Int. Cl.
*G03G 15/00* (2006.01)
*E05D 7/10* (2006.01)

(52) U.S. Cl. ..... 399/107; 15/256.51
(58) Field of Classification Search ..... 399/107, 399/123; 15/3, 100, 102; 134/9; 400/701
See application file for complete search history.

(56) References Cited

U.S. PATENT DOCUMENTS

| | | | | |
|---|---|---|---|---|
| 3,837,952 A | | 9/1974 | Mogford | |
| 4,009,047 A | | 2/1977 | Lindsay | |
| 4,982,469 A | | 1/1991 | Nishiwaki | 15/3 |
| 5,349,714 A | | 9/1994 | Korbonski et al. | |
| 5,813,073 A | * | 9/1998 | Korbonski | 15/3 |
| 5,989,358 A | | 11/1999 | Korbonski | 134/9 |
| 6,582,141 B2 | * | 6/2003 | Meier et al. | 400/701 |
| 2003/0164982 A1 | * | 9/2003 | Lien | 358/1.18 |
| 2005/0052491 A1 | * | 3/2005 | Helma et al. | 347/32 |
| 2005/0084315 A1 | * | 4/2005 | Lodwig et al. | 400/701 |

FOREIGN PATENT DOCUMENTS

| | | |
|---|---|---|
| DE | 374044 A1 | 11/1987 |
| JP | 49084 | 6/1993 |
| JP | 2583680 | 8/1998 |
| JP | 3058713 | 3/1999 |

* cited by examiner

*Primary Examiner*—Hoan Tran
(74) *Attorney, Agent, or Firm*—Alston & Bird LLP

(57) ABSTRACT

A card cleaning device for use in an image forming machine includes a frame adapted for installation into an appropriately configured image forming machine, a bottom card cleaning roller having a shaft removably coupled to the frame and adapted for cleaning a card being fed at an angle relative to the frame and a top adhesive roller coupled removably to the frame on top of the bottom roller for continuous cleaning of the bottom roller by means of friction during device operation. The cards are being fed one at a time at an angle relative to the frame to save internal printer space by a card feeder mechanism disposed proximate to the card cleaning device with the entering end of each card being slightly bent upon first card contact with a pair of card entry guides or a card entry guide plate coupled to the frame under the bottom roller so as to enable card feeding at an angle and prevent premature wear of the bottom card cleaning roller.

104 Claims, 25 Drawing Sheets

CARD CLEANING DEVICE

Matter enclosed in heavy brackets [ ] appears in the original patent but forms no part of this reissue specification; matter printed in italics indicates the additions made by reissue.

RELATED APPLICATIONS

This application is a continuation under 37 C.F.R. 1.53 (b)(1) of pending U.S. patent application Ser. No. 09/822,692, filed on Mar. 30, 2001, which is a continuation-in-part of U.S. patent application Ser. No. 09/483,624, filed on Jan. 13, 2000, which issued as U.S. Pat. No. 6,285,845 B1 on Sep. 4, 2001, which claims the benefit of U.S. provisional patent application Ser. No. 60/133,578, filed on May 11, 1999, having common assignee, the contents of the three prior patent applications being incorporated herein by reference.

BACKGROUND OF THE INVENTION

1. Field of the Invention

The present invention relates generally to printing, and more particularly to a card cleaning device for use in a card printer.

2. Prior Art

A conventional image forming device, such as a printer, sometimes includes a cleaning mechanism for cleaning the printable media which can be plastic, polyvinyl chloride (PVC) cards or the like before text, graphics or bar codes are applied to the media. Printable media may have one or two printable sides depending on the application. Some printable media have greater tolerance to pollution, such as dust particles, on the printable surfaces of the printable media and are still receptive to the printer for printing images thereon even through the printable surfaces of the printable media might not be very clean. Printers may use a ribbon mechanism for transferring images to the paper surfaces or an injection mechanism for depositing carbon particles on the paper surface to form images. The carbon particles ordinarily are well defined during printing and do not disperse once deposited on the surface of the paper. Thus, a light deposition of dust particles does not degrade significantly the printed image on the paper surface.

Other types of printable media, such as PVC cards, are particularly susceptible to pollution, i.e. the printable surface(s) of the PVC card must be maintained clean before printing to achieve acceptable print quality. Normally, these printable media, e.g., the PVC cards, require a high temperature thermal printing process to form images. Ordinarily, the temperature of the thermal printing process used to form images on these plastic printable media is very high, often much higher than a temperature of the thermal printing process, if any, needed to print on regular paper. As a result, if the printable surfaces of these printable media, e.g., the plastic cards, are not clean, the images printed thereon tend to be blurred due to this high temperature process. Even a slight deposition of dust particles on the printable surface of the plastic card will likely blur the images to be formed and greatly affect the quality of the printing results. Thus, having a cleaning mechanism is necessary for the printer adapted to print PVC cards.

The cleaning mechanism in a conventional printer typically is located inside the printer and is adjacent to a feeding mechanism. The feeding mechanism of the printer is accessible from outside for loading or unloading a printable medium stack onto the feeding mechanism. During operation, the feeding mechanism feeds the printable media, such as cards, into the printer to be printed by a print head of the printer. The cleaning mechanism of the conventional printer is coupled to the conventional printer between the feeding mechanism and the print head. Therefore, the cleaning mechanism may clean the printable medium, such as a card, fed into the printer before the card is printed by the print head.

The conventional cleaning mechanism typically includes a cleaning roller and a drive roller rotatably coupled to a support frame securely mounted to the conventional printer. The cleaning roller and the drive roller are approximately positioned in parallel to each other. The drive roller normally is rotatably coupled to the support frame and cannot be moved either laterally or vertically. The cleaning roller, however, is often rotatably coupled to the support frame by coupling both ends of a cleaning roller shaft of the cleaning roller to the support frame. The cleaning roller is properly located so that it can be positioned directly above the drive roller and is adapted to press the printable medium against the drive roller. Moreover, positions of the drive roller and the cleaning roller inside the printer are precisely disposed to allow the printable media traveling there between. A drive roller shaft of the drive roller is coupled to a gear system of the conventional printer for rotation, and the gear system is further coupled to a motor of the printer, where the motor is adapted to control the rotation of the drive roller.

When the printable medium, such as a card, is fed into the printer by the feeding medium, the card will urge the movable cleaning roller slightly up by approximately the thickness of the card. Due to the compression effect, the cleaning roller will press the card against the drive roller located underneath. The cleaning roller is typically made by silicone materials molded to the roller shape for encircling the cleaning roller shaft. In addition, a treatment process is applied to the cleaning roller for making the silicone surface of the cleaning roller sticky. The above-mentioned treatment process is well known to persons skilled in the art and is not an aspect of the present invention. Most commercially available printers incorporating the cleaning devices have the drive rollers made of the same materials as are commonly used for making the platens of the printers. When the drive roller is rotated by the motor, it drives the card toward the print head. As mentioned, the cleaning roller presses the card against the drive roller, so when the card is driven through by the drive roller, the card will cause the cleaning roller to rotate due to the sticky effect of the silicone surface of the cleaning roller.

Moreover, the sticky surface of the cleaning roller serves the purpose of removing undesirable pollutants, such as dust particles, deposited on the printable surface of the card. When the card moves through between the cleaning roller and the drive roller, the cleaning roller would pick up dust particles deposited on the surface of the card facing the cleaning roller due to the sticky effect of the cleaning roller. Thus, the printable surface of the card should face the cleaning roller for cleaning. Alternatively, drive rollers of some conventional printers are made of sticky silicone materials similar to the cleaning roller. As a result, the drive roller and the cleaning roller of these printers are adapted to clean opposite surfaces of the card. The printable surface of the card may therefore face either up or down for cleaning, or both sides of the card could be printable surfaces.

The sticky surface of the cleaning roller removes dust particles from the card surface by sticking the dust particles out of the printable surface of the card as the card rolls through the cleaning roller. After being removed from the card, the dust particles will stick to the surface of the cleaning roller. As a result, the surface of the cleaning roller accumulates more dust particles each time the cleaning roller cleans a card, and the efficacy of the cleaning roller is accordingly reduced after each cleaning. At some point in time, the cleaning roller will no longer be able to effectively remove any more dust particles from the cards due to the dirtiness on its surface. The cleaning roller, therefore, needs to be clean, or even be replaced, periodically to maintain the effectiveness of the cleaning device of the conventional printer.

As stated, the cleaning roller is coupled to the printer by inserting its cleaning roller shaft into a pair of slots on the support frame of the printer. Generally, the slots are located deep inside the printer, so it is quite difficult and inconvenient to install, to replace, or to remove the cleaning roller for cleaning or for maintenance purposes. Since the drive roller is positioned underneath the cleaning roller in the printer, it is even harder to remove or to replace those drive rollers that also serve the function to clean the cards and therefore need to be cleaned periodically. Moreover, the size of the cleaning roller in a typical conventional printer is quite small. Usually, the cleaning roller has a width of approximately 2.4 inches—slightly wider than the width of a regular business card, and it has a diameter of approximately 0.6 inches. Thus, the cylindrical surface of the cleaning roller gets saturated by the dust particles quite easily because the surface of the cleaning roller is quite small, and the cleaning roller needs to be cleaned frequently. Thus, the need arises for a card cleaning device (or cartridge) that provides easy access for maintenance, occupies a relatively small space inside the printer and eliminates the need for frequent maintenance of the cleaning rollers.

SUMMARY OF THE INVENTION

The present invention is directed to a card cleaning device for use in an image forming machine, comprising a housing adapted to be removably coupled to the image forming machine; a first cleaning member removably coupled to the housing and adapted to clean a card being fed at an angle relative to the housing, the housing being adapted to receive the card at an angle; and a second cleaning member removably coupled to the housing and adapted to clean the first cleaning member during machine operation.

The present invention is also directed to a card cleaning system for use with an image forming machine, comprising a housing adapted to be removably coupled to the image forming machine; a first cleaning member removably coupled to the housing and adapted to clean a card being fed at an angle relative to the housing along a card entry path, the housing being adapted to receive the card at an angle, the angle substantially defined between the card entry path and a card exit path relative to the housing; means for feeding the card at an angle relative to the housing; and a second cleaning member removably coupled to the housing and adapted to clean the first cleaning member during machine operation.

These and other aspects of the present invention will become apparent from a review of the accompanying drawings and the following detailed description of the preferred embodiments of the present invention.

DETAILED DESCRIPTION OF THE PREFERRED EMBODIMENTS

Figure 1:
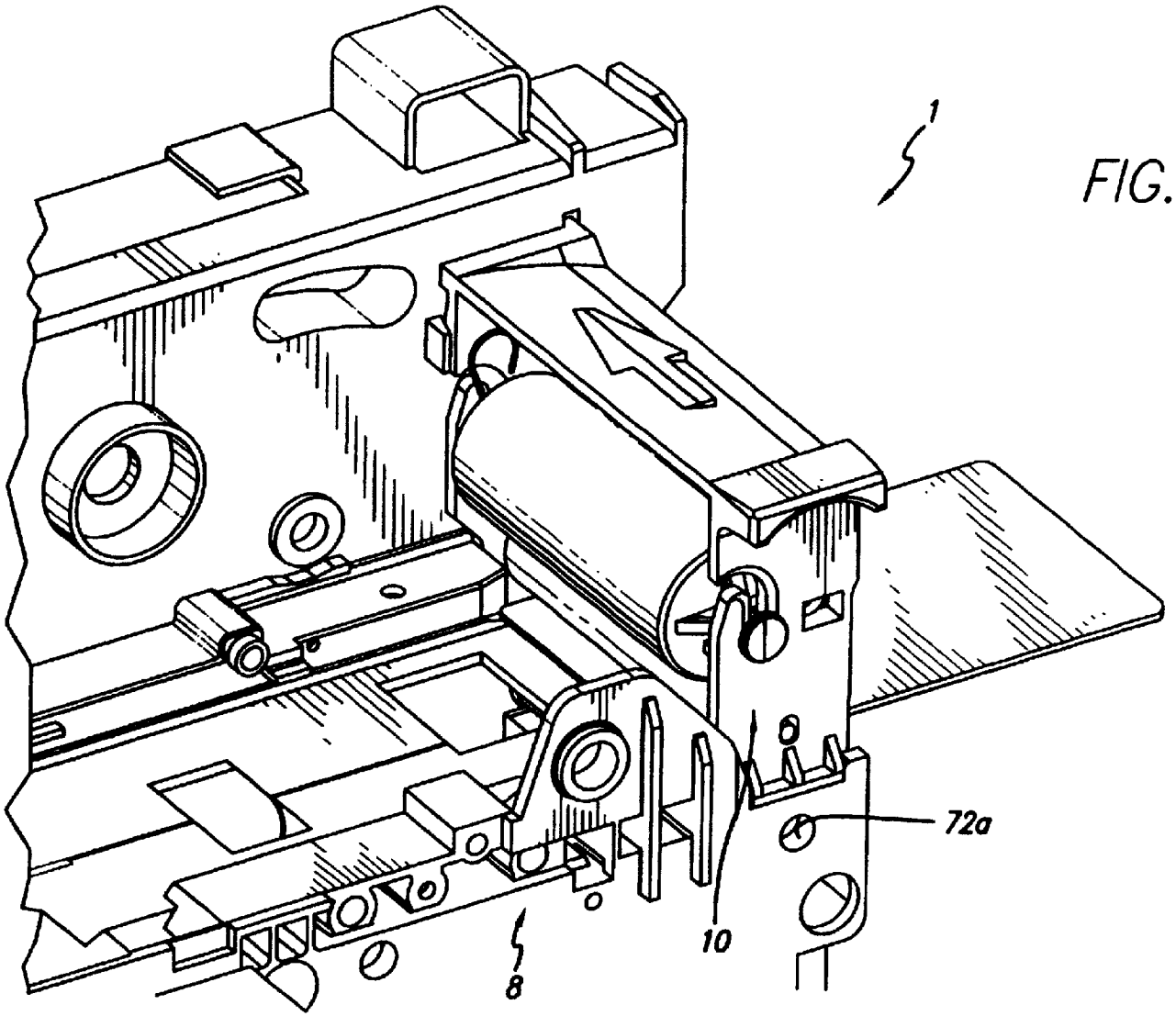
FIG. 1 is a partial perspective view of a printer including a card cleaning cartridge in accordance with the present invention.

Hereinafter, some preferred embodiments of the present invention will be described in detail with reference to the related drawings of FIGS. 1–26. Additional embodiments, features and/or advantages of the invention will become apparent from the ensuing description or may be learned by the practice of the invention.

In the figures, the drawings are not to scale and reference numerals indicate the various features of the invention, like numerals referring to like features throughout both the drawings and the description.

The following description includes the best mode presently contemplated for carrying out the invention. This description is not to be taken in a limiting sense, but is made merely for the purpose of describing the general principles of the invention.

In FIG. 1, a card cleaning cartridge 10 according to the present invention is incorporated into a printer 1 between a feeding mechanism (not shown) and a print head (not shown) of printer 1. The feeding mechanism has a receptacle means (not shown) adapted to store a stack of printable media, such as plastic cards, to be fed into printer 1 by feeding mechanism 2. Feeding mechanism 2 sequentially moves the cards into a body 8 of printer 1 to avoid jamming printer 1 during printing.

Inside body 8 of printer 1, a drive roller 30 (FIG. 7) is positioned adjacent to feeding mechanism 2 for receiving the cards fed into body 8 by feeding mechanism 2. A drive roller 30 has a drive roller shaft (not shown) rotatably coupled to a pair of receptive holes such as a hole 72a (FIGS. 1, 5, 6) disposed at each end of a support frame (not shown) of printer 1. The mounting position of drive roller 30 within printer 1 is predetermined and generally cannot be changed. Thus, drive roller 30 basically cannot move horizontally or vertically with respect to body 8 of printer 1, although it is rotatable to drive the cards toward the print head.

A gear system (not shown) positioned inside body 8 of printer 1 is coupled to the drive roller shaft at one end for rotating drive roller 30. The gear system is further coupled to a motor (not shown), also positioned inside printer body 8 of printer 1. The motor is adapted to rotate the drive roller 30 through the connection of the gear system.

Figure 2:
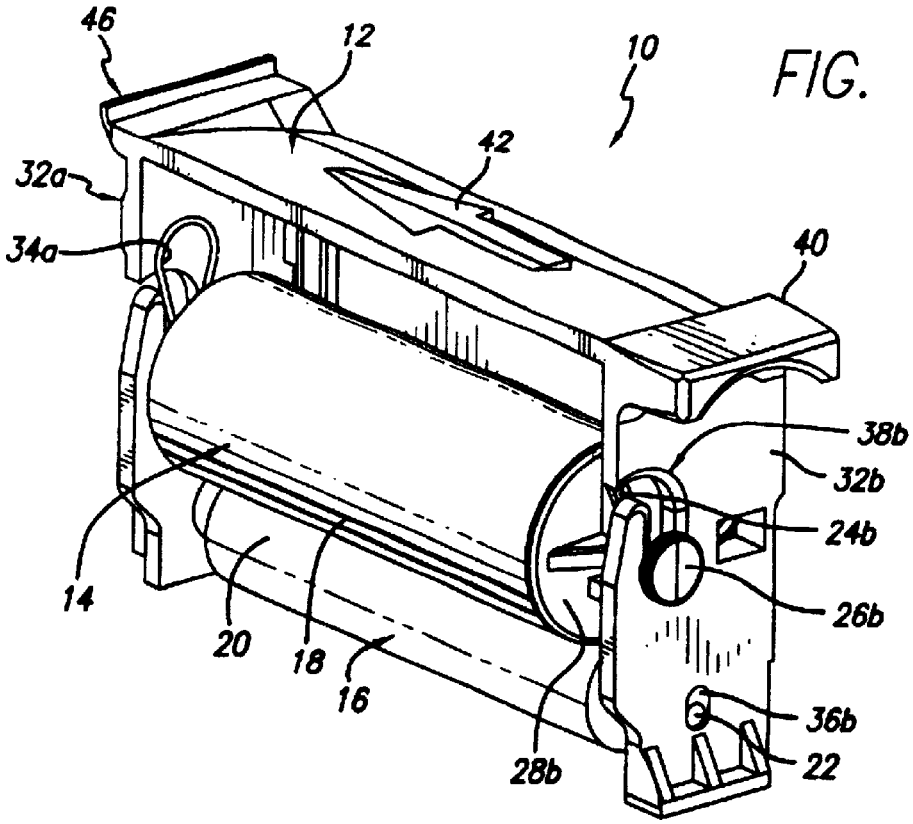
FIG. 2 is a front perspective view of the card cleaning cartridge shown in FIG. 1.

Referring to FIG. 1, the cartridge 10 is positioned inside the printer 1 adjacent to the feeding mechanism and is directly over the drive roller 30. The cartridge 10 has a lower cleaning roller 16 movably coupled to a cartridge frame 12 at opposite ends, as shown in FIG. 2. The lower cleaning roller 16 comprises a lower roller body 20 and a lower roller shaft 22 wherein the lower roller body 20 securely encircles the lower roller shaft 22. A pair of generally elliptically-shaped slots 36a, 36b are respectively positioned on left and right side walls 32a, 32b of the cartridge frame 12 near a bottom end. Opposite ends of the lower roller shaft 22 are respectively inserted into the elliptically-shaped slots 36a, 36b which are adapted to allow the ends of the lower roller shaft 22 to slide vertically along the long axes of the elliptically-shaped slots 36a, 36b. The short axes of the elliptically-shaped slots 36a, 36b are slightly larger than diameters of the ends of the lower roller shaft 22—just enough to accommodate the ends therein, so that the lower roller shaft 22 may not move horizontally within the elliptically-shaped slots 36a, 36b, as shown in FIG. 2. As a result, the lower cleaning roller 16 may only move vertically with respect to the cartridge frame 12.

Drive roller 30 is made of conventional platen materials. Thus, the surface of the drive roller 30 is usually not sticky, and driving a card situated over the drive roller 30 requires a pressure from above the card surface pressing the card against the drive roller 30. The pressure comes from the lower cleaning roller 16 of the cartridge 10. When the cartridge 10 is mounted inside printer 1, the lower cleaning roller 16 is positioned generally parallel to and directly above the drive roller 30. The lower cleaning roller 16 is located near the bottom of the cartridge 10, so that when the cartridge 10 is properly mounted on the printer 1, the lower cleaning roller 16 would, due to its weight and the pressure from a upper cleaning roller 14, press against the drive roller 30. As a result, the cards will be driven between the drive roller 30 and the lower cleaning roller 16 ad the cards are sequentially fed by the feeding mechanism.

As stated, the lower cleaning roller 16 is vertically movable within the cartridge 10 while the drive roller 30 is immovably, albeit rotatably, coupled to the printer 1 but cannot readjust its vertical position within the printer 1. When a card is fed between the lower cleaning roller 16 and the drive roller 30, the card will upwardly displace the lower cleaning roller 16 by the thickness of the card, while the frame 12 of the cartridge 10 is coupled to the printer 1 by a pair of magnets 68a, 68b (FIG. 4) and does not move upward. In addition, the length of the long axes of the elliptically-shaped slots 36a, 36b is selected to accommodate the thickest cards possibly intended to be fed into the printer 1 for printing. Thus, the upper most position that the lower cleaning roller 16 might reach is determined by the length of each of the long axes of the elliptically shaped slots (e.g., slot 36b in FIG. 2).

As a blank card is fed between the lower cleaning roller 16 and drive roller 30, the card is driven by the drive roller 30, which comes into contact with a bottom surface of the card, toward the print head. The lower cleaning roller 16 is adapted to remove dust from the surface of the card coming into contact with the lower cleaning roller 16. Unlike the drive roller 30, no gearing system is coupled to the lower cleaning roller 16 to drive it. Moreover, the roller body 20 of the lower cleaning roller 16 is commonly made of 35 Shore-A silicone materials, the surface of which, after processed, will be slightly sticky. A manufacturing procedure to mold the silicone materials into a sticky roller is well known in the art and is not a concern of the present invention. Due to the sticky surface of the lower roller body 20, when the card is driven toward the print head by the drive roller 30 between the lower cleaning roller 16 and the drive roller 30, the card will cause the lower cleaning roller 16 to rotate over the full length of the printable surface, which faces the lower cleaning roller 16. As a result, the sticky surface of the lower roller body 20 will pick up dust particles deposited on the printable surface of the card while the card is moved over it. The sticking power of this lower cleaning roller 16, however, shall not be too high. Otherwise, the lower roller body 20 will not only pick up the dust particles off the card surface but will also stick to the card itself causing the card to jam the printer 1. The 35 Shore-A silicone materials commonly used to make the lower roller body 20 provide an ideal sticky surface, i.e., sticky enough to pick up most dust particles on the printable surface but not too sticky so as not to jam the printer 1.

The lower roller body 20 has a low hardness in order not to damage the printable surfaces of the cards. As mentioned, the lower roller body 20 will attach some dust to its surface during cleaning. Thus, if the surface of the lower roller body 20 is too hard, it will probably cause damages, such as scratches, to the printable surface of the card when it rolls over the card. Moreover, the low hardness of the lower roller body 20 allows a small distortion of its surface when under pressure. Hence, it provides a good contact between the lower cleaning roller 16 and the card because a contact surface between them increases when the hardness of the lower roller body 20 decreases and the contact surface is always on the whole card width, even if there are dust particles on the card, due to the slight distortion of the surface of the lower roller body 20. Again, a lower roller body 20 made preferably by commonly used silicon materials would provide an ideal surface hardness. In other alternative embodiments, other materials may also be adopted to make the lower roller body 20 as long as the stickiness and the hardness qualities of the final product will fit the above-mentioned principles according to the present invention.

Each time the lower cleaning roller 16 rolls over a card to clean its printable surface, the surface of the lower roller body 20 gets dirtier accordingly. Consequently, as soon as this lower cleaning roller 16 gets some dust on its surface, its cleaning power decreases. A method to keep the surface of the lower roller body 20 clean is therefore needed. As stated previously, the cleaning roller in a conventional printer needs to be removed frequently in order to clean the surface of the cleaning roller or to replace a new one. Removing and cleaning a cleaning roller from the conventional printer is not convenient and may be quite labor intensive. Furthermore, the cleaning roller gets dirty frequently, and replacing a new one each time it gets dirty is not very cost effective. All these problems are resolved by the present invention, as will be explained in further detailed.

Figure 3:
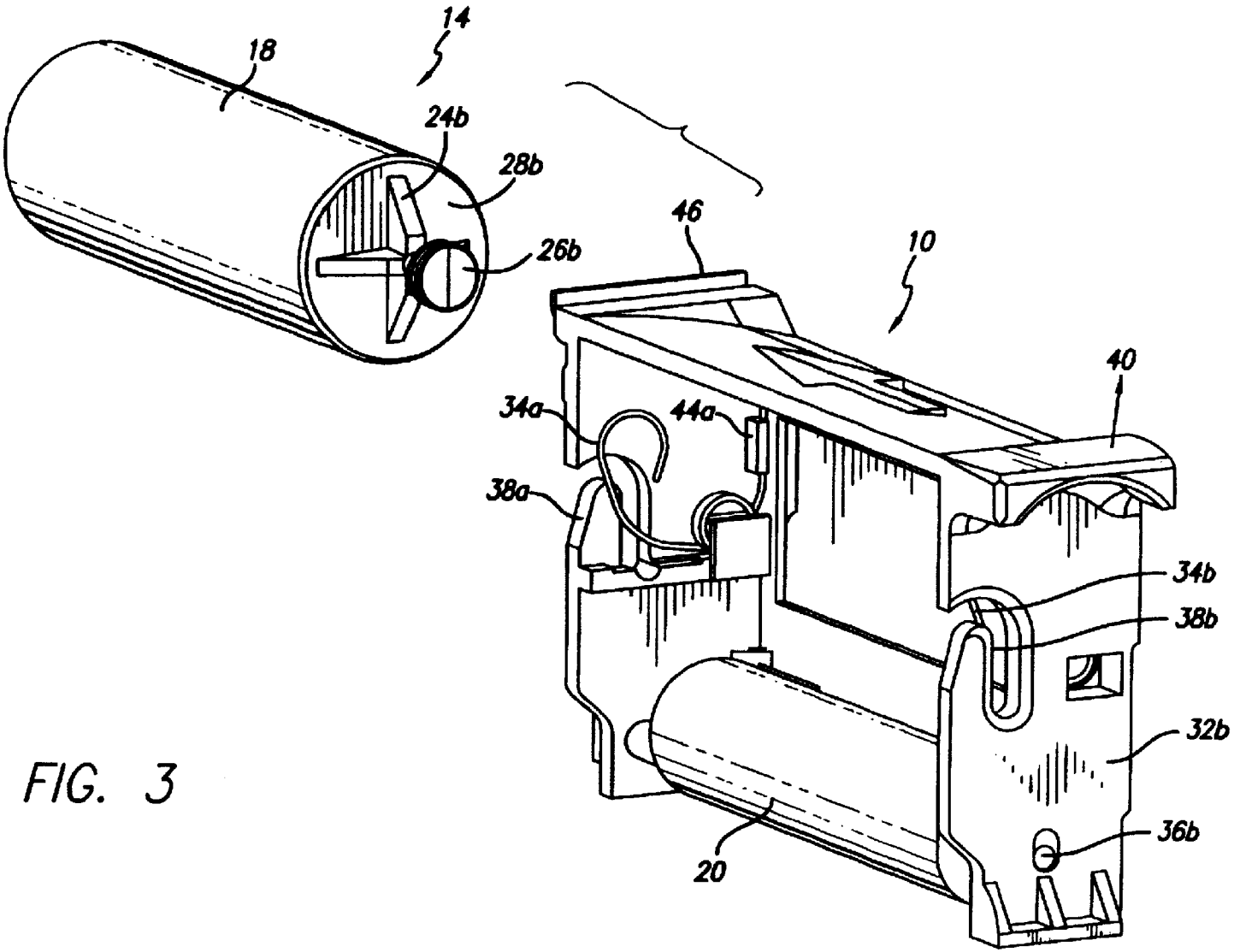
FIG. 3 is a perspective view of the card cleaning cartridge of FIG. 2 with the upper cleaning roller removed.

In accordance with a preferred embodiment of the present invention, an additional upper cleaning roller 14 is included in cartridge 10. Referring to FIG. 3, the upper cleaning roller 14 comprises an upper roller body 18 capped by an end cap at each end, 28a or 28b. The end caps 28a, 28b each includes cap nobs 26a, 26b respectively coupled to a support rack 24a or 24b through narrow nob necks. The upper cleaning roller 14 is rotatably coupled to the side walls 32a, 32b, and is positioned directly above the lower cleaning roller 16. A pair of open slots 38a, 38b having approximately reverse-J shape are respectively formed in the side walls 32a, 32b. The narrow nob necks of the cap nobs 26a, 26b are adapted to slide into and be received by the open slots 38a, 38b. The cap nobs 26a, 26b are much larger than their respective nob necks. As a result, the upper cleaning roller 14 will not unintendedly fall off the cartridge 10 once it is mounted thereon, as shown in FIG. 2. The vertical length of the open slots 38a, 38b are also selected so that when the upper cleaning roller 14 is inserted into the open slots 38a, 38b of the cartridge 10, the upper roller body 18 is adapted to touch and press against the lower roller body 20. In addition, the diameters of the nob necks of the cap nobs 26a, 26b are smaller than the channel widths of the open slots 38a, 38b. Therefore, the nob necks may freely rotate and slide vertically within the open slots 38a, 38b, and the upper cleaning roller 14 will accordingly rotate and slide vertically.

Left and right leaf springs 34a, 34b are mounted to the inner side of the side walls 32a, 32b, as shown in FIGS. 2 and 3. The leaf springs 34a, 34b have extensions adapted to press down on the nob necks to in tern press the upper cleaning roller 14 downward against the lower cleaning roller 16. Thus, the upper cleaning roller 14 is adapted to be rotated by friction with the lower cleaning roller 16 when the latter rotates. In one embodiment, the left and right leaf springs have approximately 0.1 kg pressing force on the upper cleaning roller 14.

The upper roller body 18 comprises a tube shape roller and a sticky strip is wrapped over the tube shape roller. The sticky strip has a higher sticking power than the surface of the lower cleaning roller 16 and is thus adapted to remove dust deposited on the surface of the lower cleaning roller 16. As a result, the upper cleaning roller 14 removes directly from the lower cleaning roller 16 and indirectly from the cards. The sticky power of the surface of the upper roller body 18 is stronger than the sticky power of the surface of the lower roller body 20. Due to the high sticking power of the upper cleaning roller 14, the cleaning of the lower cleaning roller 16, and consequently the cleaning of the cards, is far more efficient than when using a duster or a cleaning card. Also, sticking power of the upper roller body 18 can be stronger than that of the lower roller body 20 since the upper roller body 18 does not touch the cards directly. Thus, the higher sticking power of the upper roller body 18 will not hold onto the cards and jam the printer 1. Thus, the lower cleaning roller 16 serves as an intermediate to transfer dust from the cards to the upper cleaning roller 14. Accordingly, the lower cleaning roller 16 does not need cleaning maintenance and its life is potentially much longer than those counterparts used in the conventional printers.

The upper cleaning roller 14 is also larger than the lower cleaning roller diametrically, so the upper cleaning roller 14 has a larger effective cleaning surface than the surface of the lower cleaning roller 16. In one embodiment where the upper cleaning roller 14 and the lower cleaning roller 16 have a same width-W, and the upper cleaning roller 14 has a radius R1 and the lower cleaning roller 16 has a radius R2, the effective cleaning surface of the upper cleaning roller 14 will be $2\pi WR1$ and the lower cleaning roller 16 will be $2\pi WR2$. The effective cleaning surface difference between the upper cleaning roller 14 and the lower cleaning roller 16 will be $2\pi W(R1-R2)$. In this embodiment, W is approximately 2.4 inches, R1 is approximately 0.5 inches, and R2 is approximately 0.3 inches. Thus, the effective cleaning surface of the upper cleaning roller 14 is much larger than the effective cleaning surface of the lower cleaning roller 16. As a result, the upper cleaning roller 14 can retain much more dust than the lower cleaning roller 16 and need not be cleaned as frequently as the smaller surface of the cleaning roller used in the conventional printer.

The upper cleaning roller 14 is also vertically movable when mounted on the cartridge 10. When the card upwardly displaces the lower cleaning roller 16, as stated above, the upper cleaning roller 14 is also upwardly displaced accordingly. Thus, the upper cleaning roller 14 cleans the lower cleaning roller 16 when the latter cleans the printable surface of the card. In addition, the sticky strip of the upper roller body 18 is made of double-coated paper tape. Thus, the sticky strip and/or the whole upper roller body 18 are easily replaceable. In one embodiment, the paper tape is approximately 12 mil thick having an adhesion force of 40 oz/inch and a tensile strength of 34 lb/inch. The upper roller body 18 is made of materials much cheaper than the silicone materials used to make the lower roller body 20. As compared to the conventional printers that replace the silicone cleaning rollers for maintenance, the present invention replaces the upper roller body 18 of the upper cleaning roller 14 or the sticky strip. By making the upper roller body 18 and/or the sticky strip replaceable, which is much cheaper than replacing the lower cleaning roller 16, the present invention is much more cost effective than the conventional printers.

Figure 4:
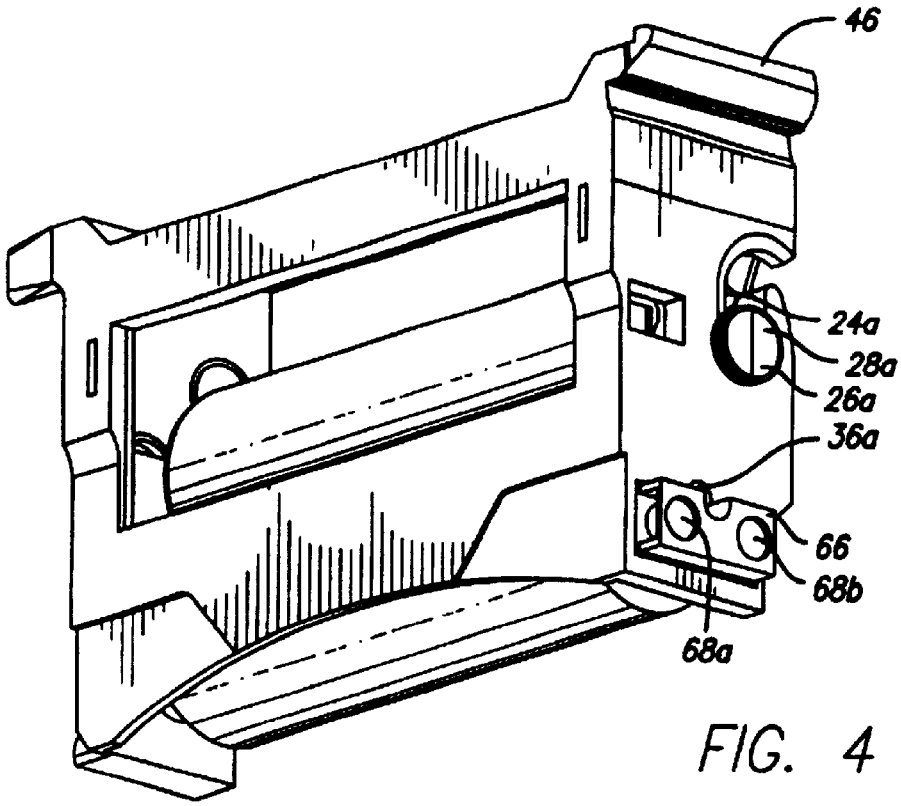
FIG. 4 is a bottom perspective view of the card cleaning cartridge of FIG. 2 in accordance with the present invention.
Figure 5:
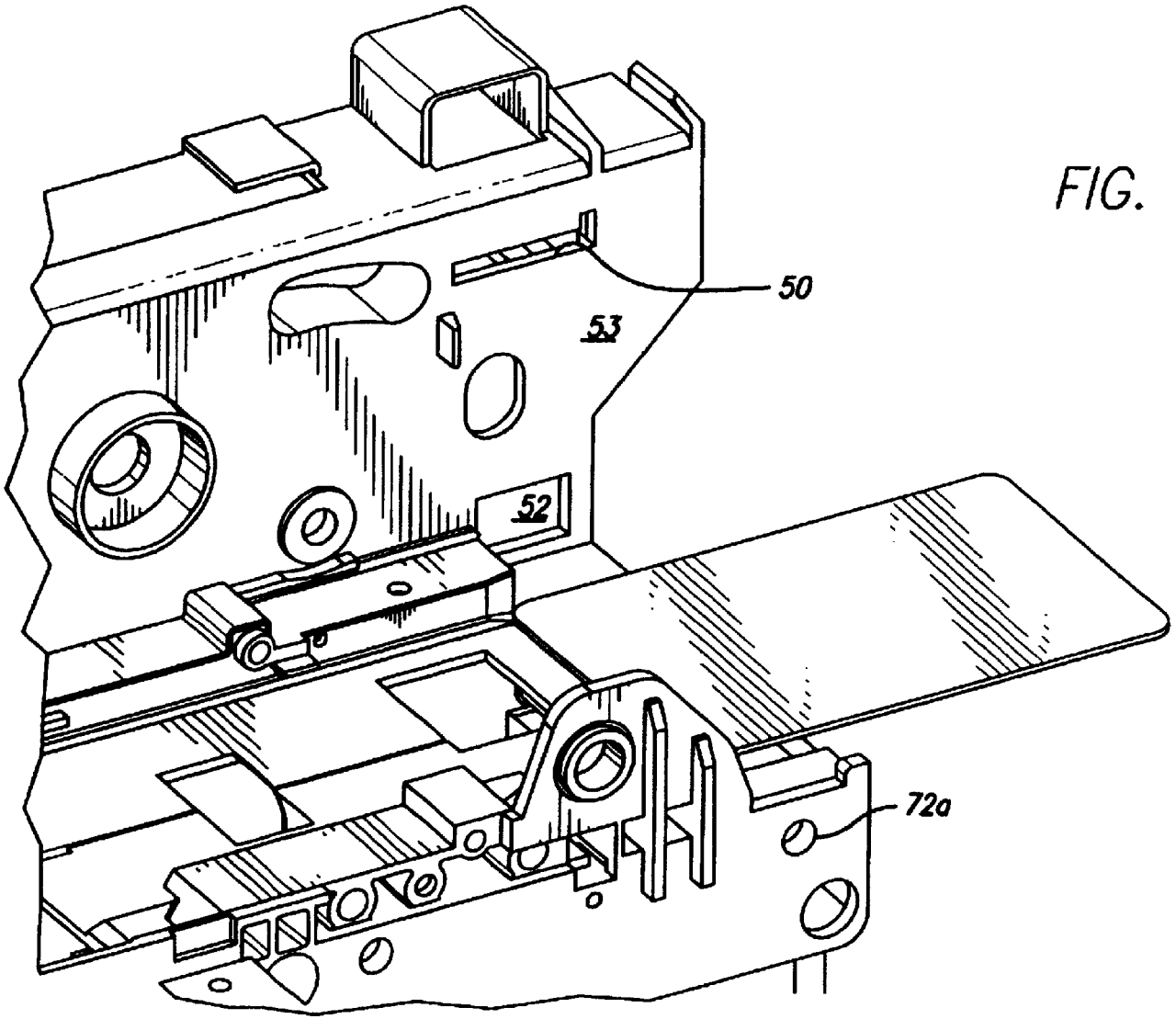
FIG. 5 is a partial perspective view of the printer of FIG. 1 with the card cleaning cartridge removed.

Unlike the conventional printers, the present invention also has the advantage of easy access to and easy replacement of the cleaning cartridge. As can be seen from FIGS. 2 and 4, the cartridge 10 has a latch 46 at one end and a handle 40 at the opposite end, both on the top of the cartridge 10. The latch 46 is adapted to be inserted into a latch slot 50 located on a back wall 53 inside the printer 1, as shown in FIG. 5. The latch slot 50 is of the size slightly wider than the latch 46, so the latch 46 can be inserted therein but the latch slot 50 leaves not much extra space for the latch 46 to slide laterally or vertically. When the latch 46 is inserted into the latch slot 50, the latch 46 latches the cartridge 10 to the printer 1 by catching against the reverse side of the back wall 53. Furthermore, the cartridge 10 has the pair of magnets 68a, 68b positioned on the left side wall 32a at the outer side near the bottom (FIG. 4). The magnets 68a, 68b are held by a holder 66 securely mounted on the left side wall 32a at the outer side. When the cartridge 10 is mounted on the printer 1, the magnets 68a, 68b will be firmly held by strong magnetic forces to a metal plate 52, which is positioned inside the printer 1 under the slot 50. Thus, the cartridge 10 is securely mounted inside the printer 1 without undesired lateral movement during operation, as shown in FIG. 1. In one embodiment, the magnetic force of each magnet is approximately 0.3 Kg at 0.5 mm, and the magnets are made of compressed Plasto-Neodymium materials. In alternative embodiments, other magnets made of different materials and/or providing different magnetic forces may be adopted without deviating from the noted inventive principle.

Figure 6:
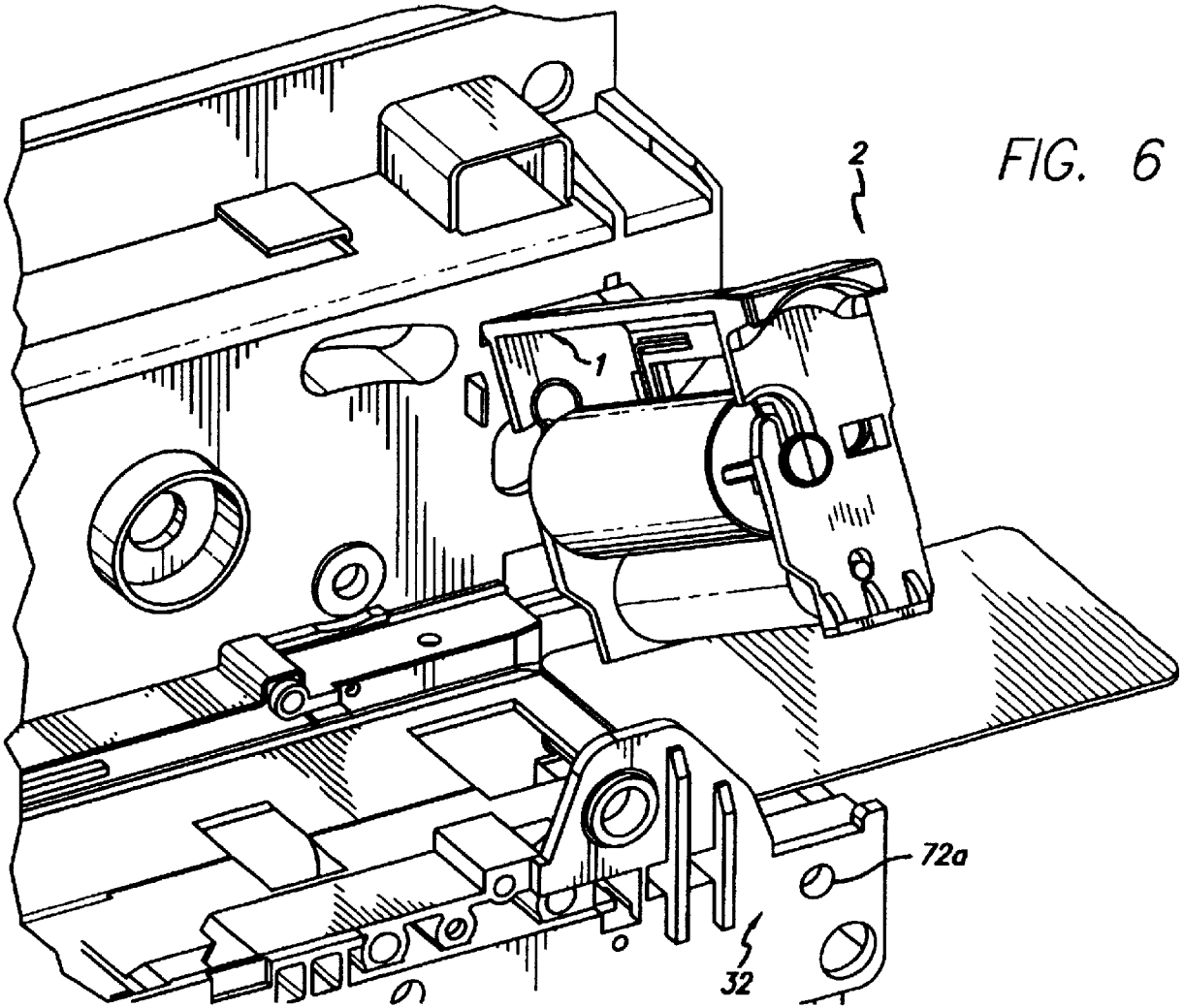
FIG. 6 is a partial perspective view of the printer of FIG. 1 with the card cleaning cartridge being installed in the printer in accordance with the present invention.
Figure 7:
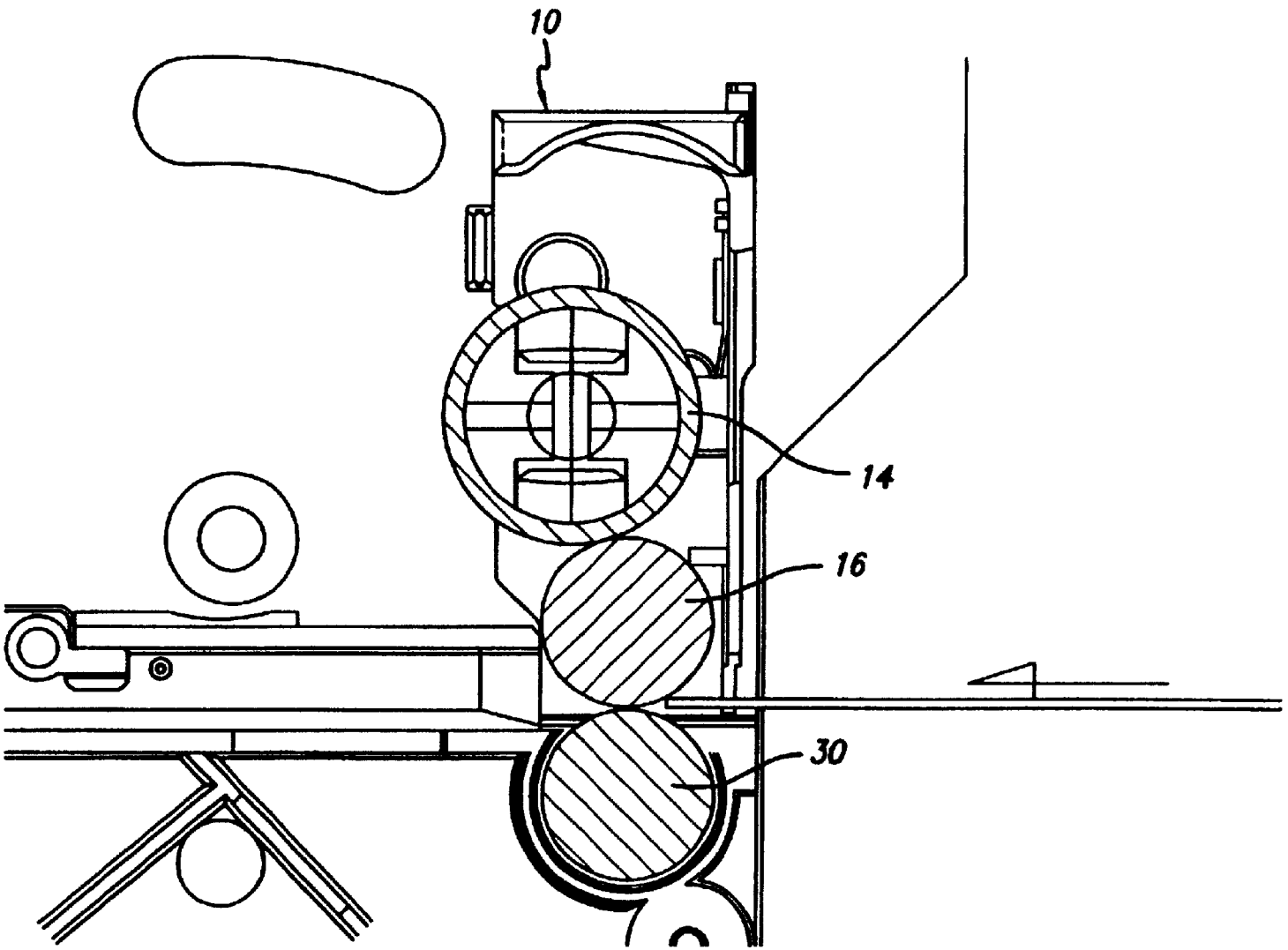
FIG. 7 is a cross-sectional view of the printer and card cleaning cartridge of FIG. 1 in an operational configuration.

Thus, the cartridge 10 is much easier to remove than removing the cleaning rollers in the conventional printers. To remove the cartridge 10, the user just pulls the handle 40 upward to disengage the magnets 68a, 68b from the metal plate 52, as shown in FIG. 6. Once the magnets 68a, 68b and the metal plate 52 are disengaged, the user may lift the cartridge 10 up until the cartridge 10 is displaced in an angle suitable for the latch 46 to slide out of the latch slot 50 (FIG. 5). To install the cartridge 10 onto the printer 1, a reverse process to the above-mentioned procedure is performed. Unlike the present invention, to remove a cleaning roller in a conventional printer the user needs to disengage the cleaning roller from two slots buried deep inside the conventional printer. Thus, the present invention improves the accessibility and the ease of replacement of the cleaning cartridge greatly.

As mentioned, the upper cleaning roller 14 is made of inexpensive materials and can be manually removed from cartridge 10. The upper cleaning roller 14 has an end cap 28a or 28b (molded plastic) attached at each end, which allows the user to handle it without putting fingers on the sticky surface of the upper roller body 18. Any new upper cleaning roller 14 is delivered with a removable coating protecting the sticky surface from dust during transportation and from contacting with a shipping package. An optional configuration is to have a multi-sticking-coating upper cleaning roller 14. Thus, a dirty coating, which will usually be the outermost one, could be peeled off, causing a new sticking coating to appear from underneath.

From the foregoing, it will be appreciated that, although specific embodiments of the invention have been described herein for purposes of illustration, various modifications may be made by persons skilled in the art without deviating from the spirit and/or scope of the invention. In particular, dimensions of all components may be varied for adapting to different-size image forming machines. The drive roller may also be made of silicon materials, making the drive roller suitable to clean the bottom surfaces of the cards. The leaf springs of the above-described preferred embodiment may be replaced by alternative types of mechanisms to provide pressure to the upper and lower cleaning rollers.

Figure 10:
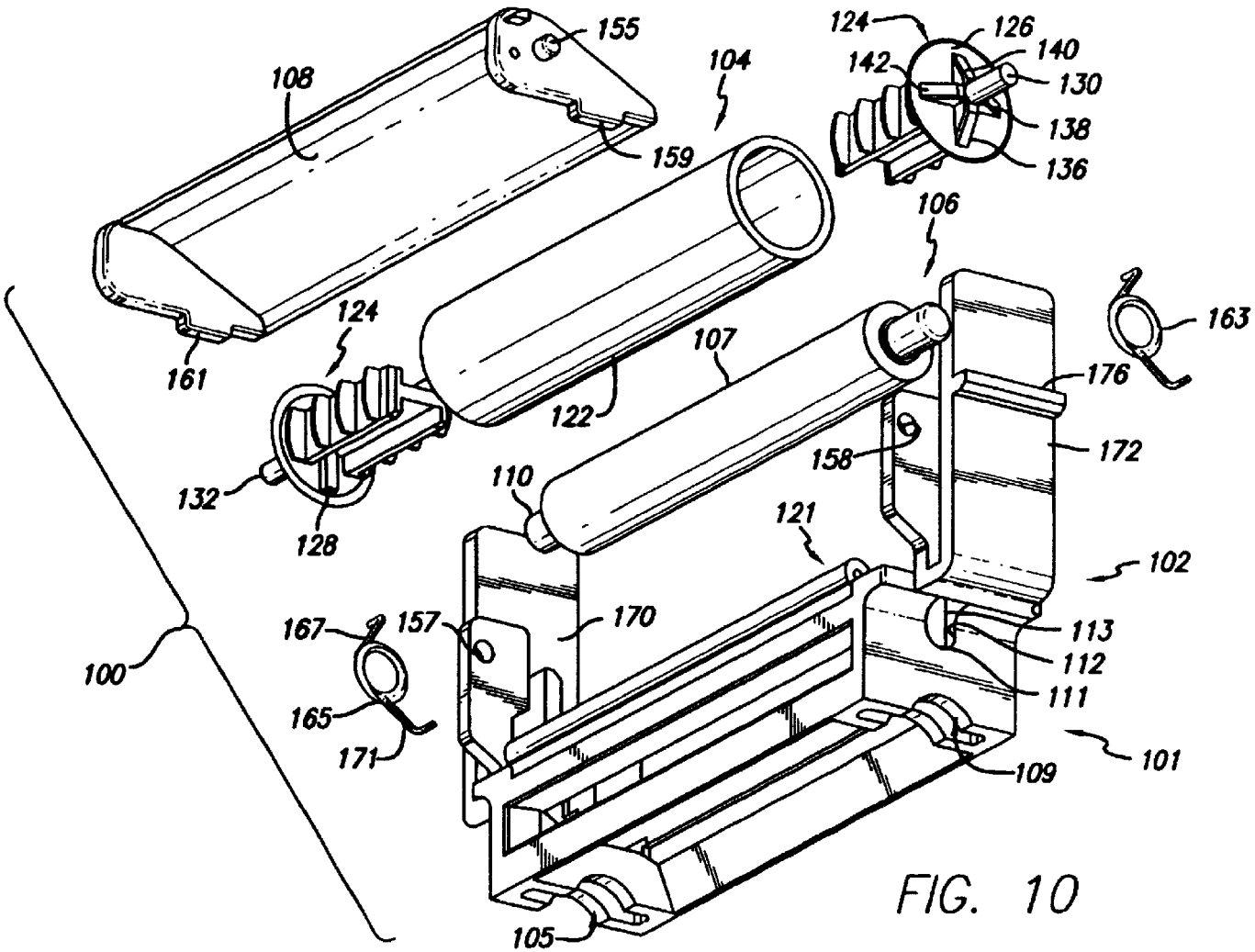
FIG. 10 is an exploded perspective view of the various components of the card cleaning device of FIG. 8.
Figure 11:
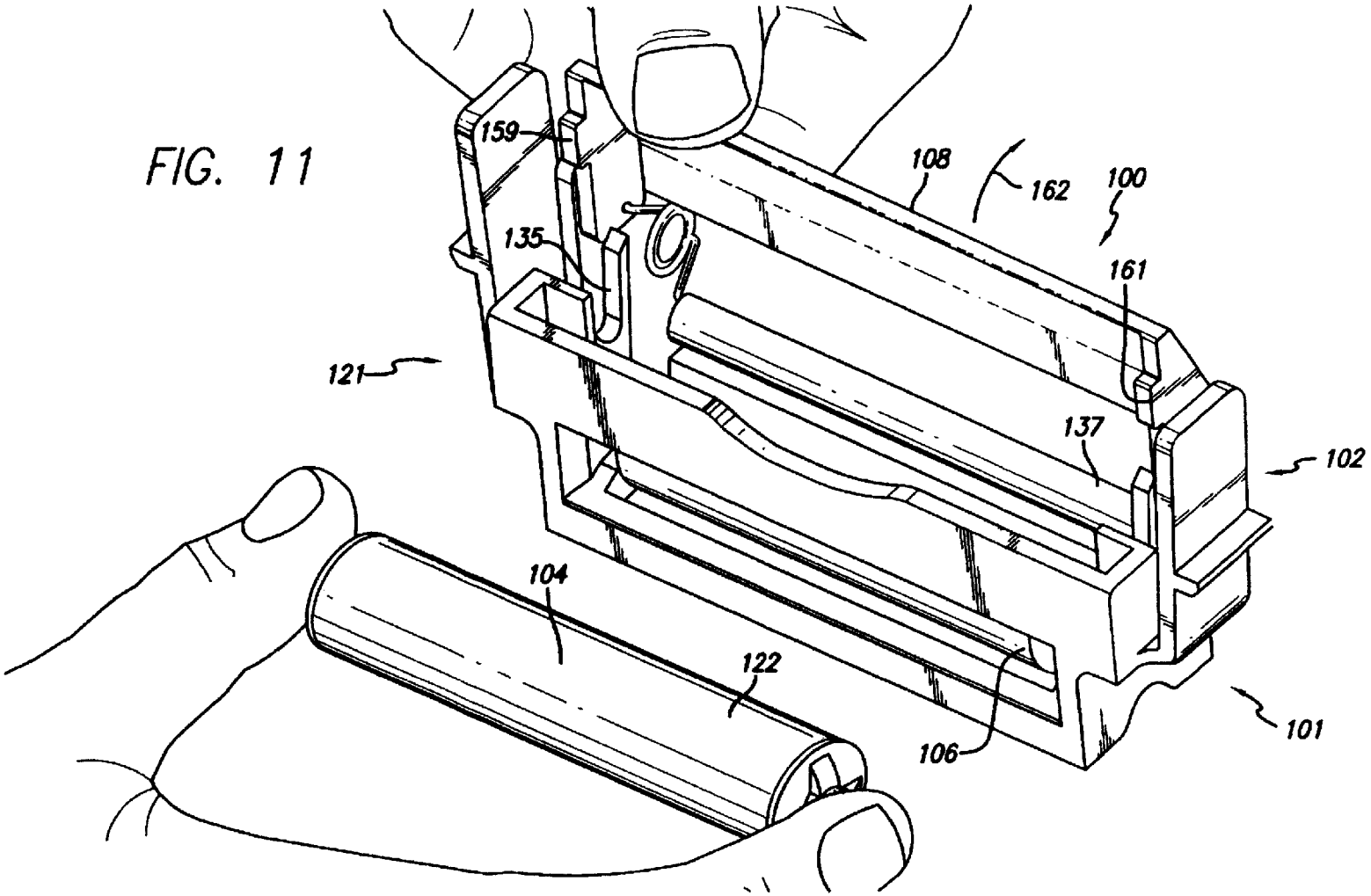
FIG. 11 is a perspective view of a user performing maintenance on the card cleaning device of FIG. 8.

In accordance with another preferred embodiment of the present invention and as generally illustrated in FIGS. 8–19, a card cleaning device for use in card printers, generally referred to by reference numeral 100, comprises a plastic frame 102 (FIG. 10) having a lower portion 101 adapted to operatively accommodate a bottom card cleaning roller 106 and an upper portion 121 adapted to operatively accommodate a top adhesive roller 104 on top of card cleaning roller 106 with top roller 104 being in frictional contact with roller 106. Card cleaning device 100 also includes a plastic lid 108 pivotally hinged on each side to upper portion 121 of plastic frame 102 for manual rotation between a closed position during printer operation and an open position to allow easy access to top adhesive roller 104 for maintenance or replacement as generally illustrated in FIG. 11.

Figure 12:
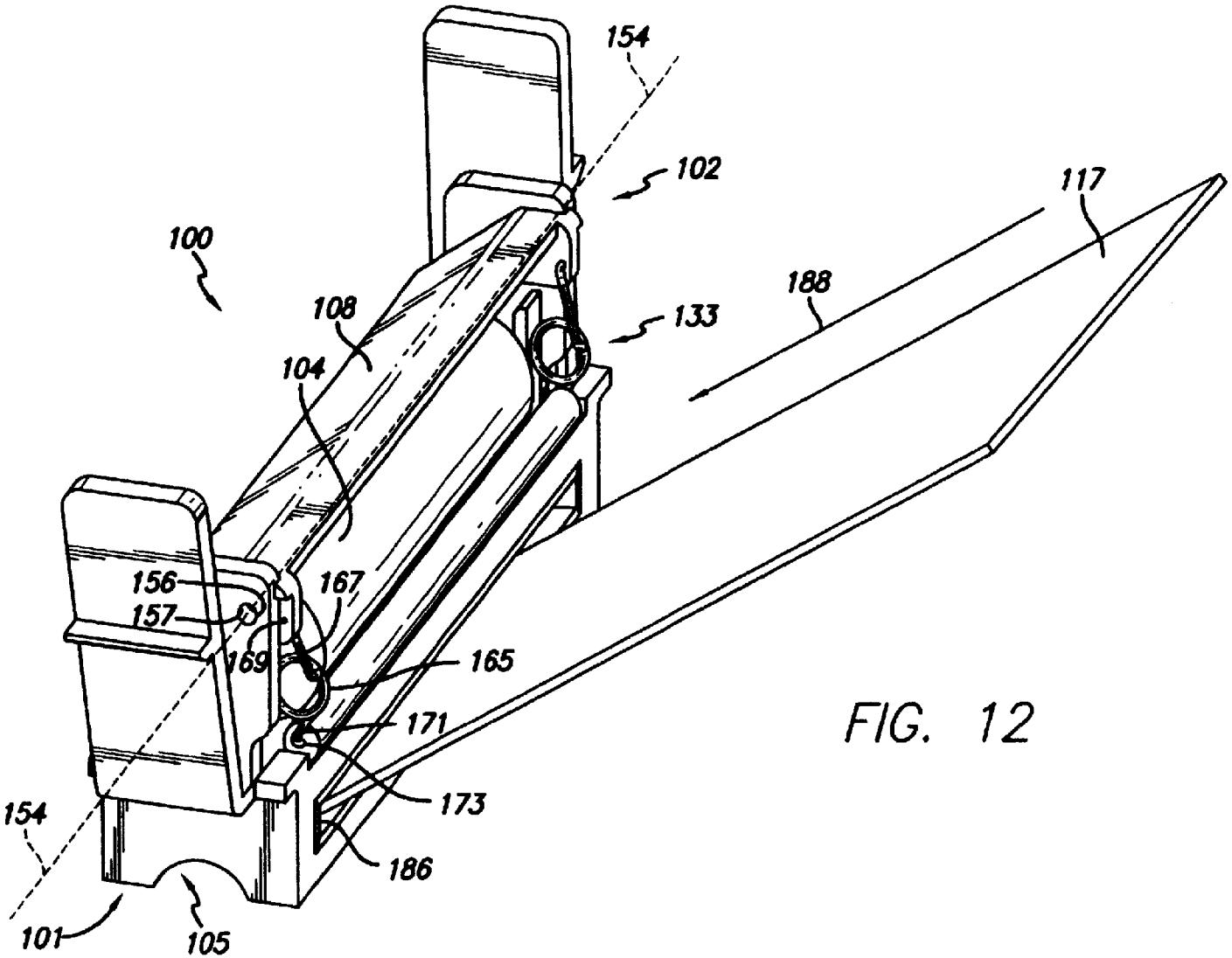
FIG. 12 is a perspective view of a card about to be fed at an angle into the card cleaning deice of FIG. 8 in accordance with the present invention.

Plastic lid 108 includes at each end an integral cylindrical post, such as post 155 in FIG. 10 or post 156 in FIG. 12, for mounting into a respective aperture, such as aperture 158 or aperture 157 provided on upper portion 121 of frame 102 (FIGS. 10, 12), respectively. Lid 108 can be manually rotated by the user to a fully open position to facilitate roller maintenance as shown by directional arrow 162 in FIG. 11. A pivot axis 154 may be defined through the center of each cylindrical post (155, 156) as illustrated in FIG. 12 with lid 108 pivoting about axis 154. The approximate range of angular motion of lid 108 about pivot axis 154 may be, for example, about 0°–90° with 0° corresponding to a fully closed position of lid 108 as shown, for example, in FIG. 9, and 90° corresponding to a fully open position of lid 108 as shown, for example, in FIGS. 8, 11. Other ranges of motion for lid 108 may be utilized provided such other ranges of motion do not depart from the scope and spirit of the present invention.

Figure 14:
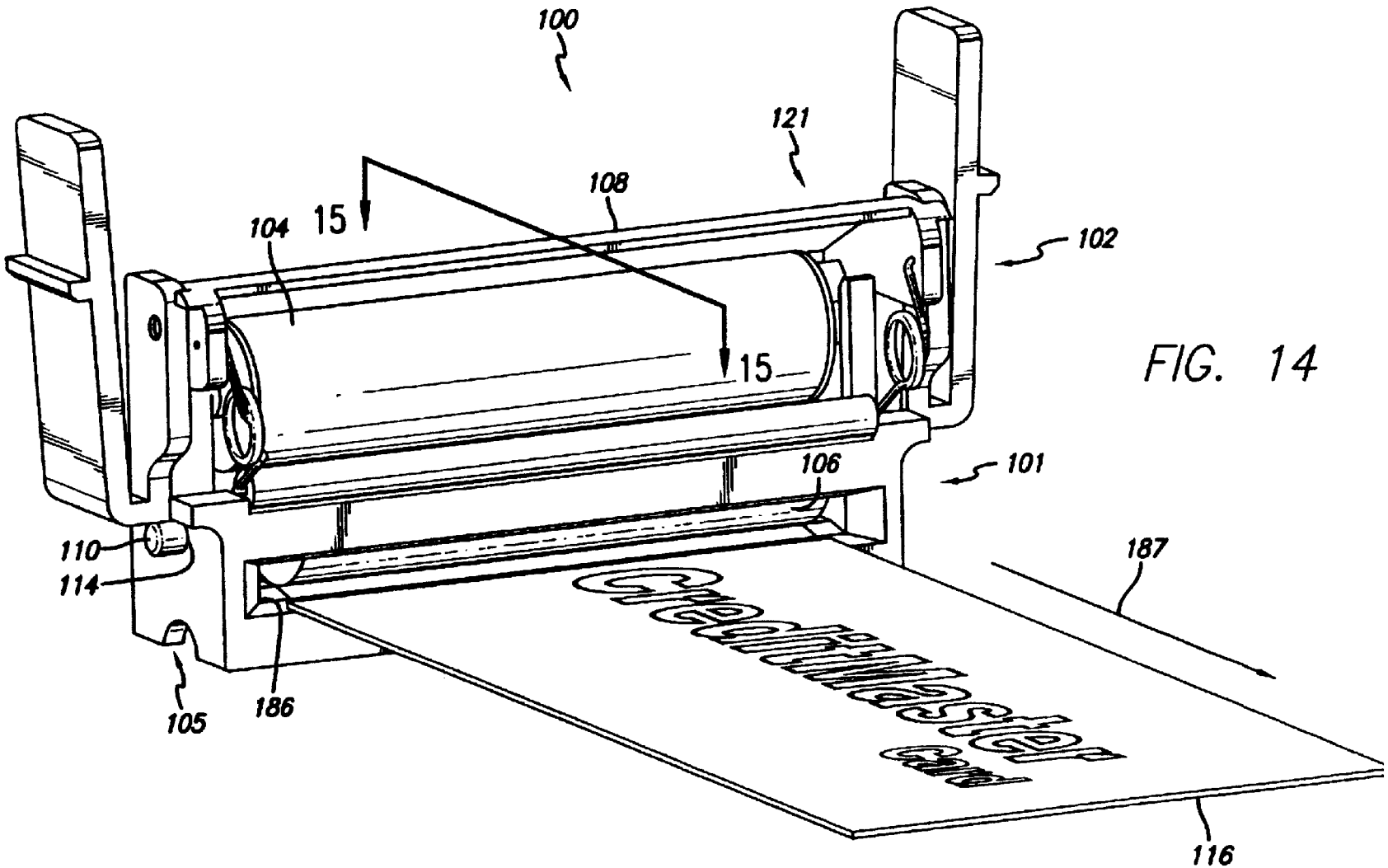
FIG. 14 is a perspective view of a printed card exiting the card cleaning device of FIG. 8 in accordance with the present invention.

Bottom card cleaning roller 106 is essentially identical in construction to lower cleaning roller 16 of FIG. 2 and includes a solid annular silicon rubber body 107 (FIG. 10) with a slightly sticky outer surface area for picking up dust particles from a passing card and a solid generally cylindrical shaft 110 disposed inside annular body 107 and projecting to a certain extent on each side (away from body 107) as shown in FIG. 10. Bottom card cleaning roller 106 performs essentially the same function as lower cleaning roller 16 of FIG. 2 during device operation. Cylindrical shaft 110 mounts at each end for rotation in a generally L-shaped aperture provided on each side of frame 102 such as aperture 112 (FIG. 10) and aperture 114 (FIG. 14). Apertures 112, 114 are designed to allow some vertical movement of mounted shaft 110 to accommodate the card thickness of a passing card but almost no horizontal movement of mounted shaft 110 (FIG. 14) during printer operation. Each aperture is also adapted to allow easy removal of bottom roller 106 for maintenance as generally illustrated in FIG. 10. Specifically, each L-shaped aperture has a generally elongated vertical bottom portion, such as bottom portion 111 of aperture 112 (FIG. 10), for accommodating the projecting end of mounted shaft 110 and an elongated generally outwardly curved (away from lower portion 101 of frame 102) horizontal top portion, such as top portion 113 of aperture 112 (FIG. 10), to provide the extra space needed to allow disengagement of each end of mounted shaft 110 from frame 102 whenever bottom cleaning roller 106 needs maintenance or replacement. Before bottom roller 106 can be disengaged from frame 102, top adhesive roller 104 should be removed from frame 102 as generally illustrated in FIG. 11.

Figure 15:
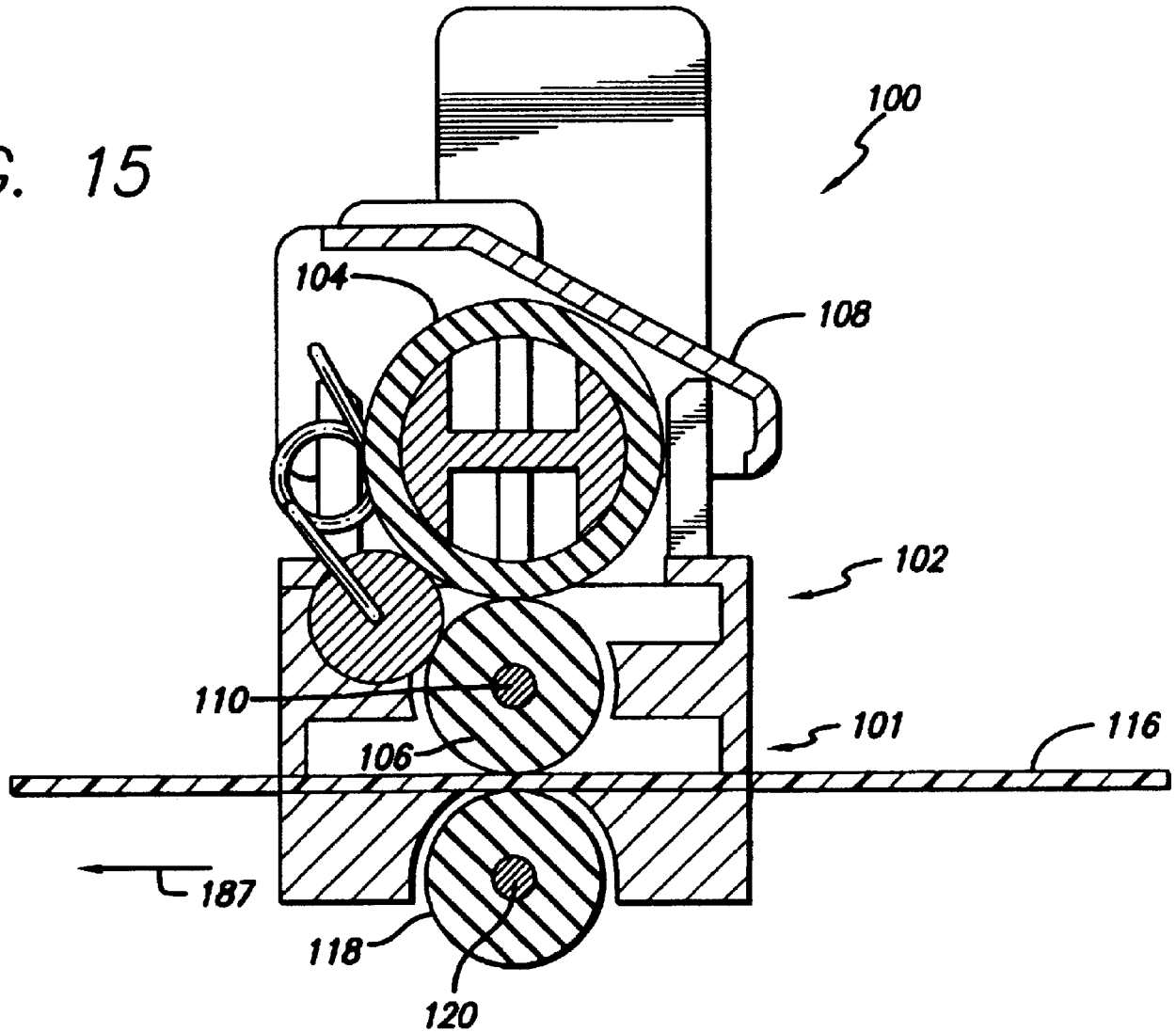
FIG. 15 is a cross-sectional view taken along section line 15—15 of FIG. 14 in accordance with the present invention.

As further depicted in FIG. 10, top adhesive roller 104, which has similar construction and essentially identical function as upper cleaning roller 14 of FIG. 3, comprises generally a tubular plastic body 122 with an inner removable two-piece ribbed core 124 which terminates on each side with a circular end cap such as end caps 126, 128 (FIG. 10). The ribbed core construction is presently preferred as less material is used to construct the core during manufacturing which reduces weight and cost for the manufacturer and in addition the ribs provide better resistance to traction and better adherence compared to a planar (cylindrical) core surface. Each end cap includes an outwardly protruding cylindrical post, such as posts 130, 132 (FIG. 10), which is supported on four integral generally triangular-shaped racks such as racks 136, 138, 140, 142 (FIG. 10). Each cylindrical post mounts for rotation in a corresponding generally V-shaped slot on frame 102 (flared portion of slot facing away from upper portion 121 of frame 102), such as slot 135 or slot 137, provided at each end of frame 102 as shown in FIG. 11. Slots 135, 137 are designed to allow some vertical movement but almost no horizontal movement to a mounted post (of top adhesive roller 104). The end cap design facilitates insertion of top adhesive roller 104 in slots 135, 137 while the V-shaped slot design helps keep mounted top roller 104 in place during device operation. Top roller 104 is preferably mounted directly on top of mounted bottom roller 106 in accordance with the general principles of the present invention as shown in FIG. 15.

The outer surface of tubular body 122 is preferably wrapped with an adhesive strip layer 103 (FIG. 8) which is essentially identical to the one used in the above-described preferred embodiment and is generally stickier than the outer surface of bottom cleaning roller 106. Several overlapping adhesive strip layers (not shown) may be used if desired such that the top-most used adhesive layer may be peeled off by the user to reveal another clean (unused) adhesive layer underneath. Furthermore, adhesive top roller 104, preferably, has a diameter greater than the diameter of bottom card cleaning roller 106 (FIG. 15) so as to provide a substantially larger effective cleaning surface area relative to the surface area of bottom cleaning card roller 106. The larger effective cleaning surface area allows top adhesive roller 104 to pick up and retain more dust particles than bottom roller 106 which prolongs the life of bottom cleaning roller 106 and is a significant advantage over prior art card cleaning schemes as bottom roller 106 need not be changed as often as needed in conventional card printers.

Maintenance of top adhesive roller 104 is relatively easy as roller 104 may either be replaced with a new adhesive roller or, if equipped with multiple surface adhesive layers, the user would simply peel off the top used adhesive layer to expose a clean adhesive layer underneath. To perform maintenance on top adhesive roller 104, the user flips lid 108 to one side with one hand as shown by directional arrow 162 and pulls top roller 104 out with the other hand (FIG. 11).

To maintain pressure on cylindrical posts 130, 132 of top adhesive roller 104 during device operation, lid 108 is preferably provided on each side with an integral generally rectangular-shaped bump, such as bumps 159, 161 (FIGS. 8, 10, 11) and is spring loaded via a pair of coiled springs 163, 165 (FIG. 10) which are mounted between lid 108 and the body of plastic frame 102 as generally illustrated in FIGS. 11–14. For example, upper end 167 of coiled spring 165 is preferably mounted into a corresponding aperture 169 provided on the inner side of frame 102 and lower end 171 of coiled spring 165 is mounted into a corresponding aperture 173 provided on the body of frame 102 as shown in FIG. 12. Spring 163 is mounted on the other side in a similar fashion (FIG. 12). When lid 108 is in a fully closed position during device operation coiled springs 163, 165 exert the necessary amount of pressure on posts 130, 132 of top adhesive roller 104 through the body of lid 108 to assure proper operation of top adhesive roller 104. Spring loading of lid 108 maintains (by way of top adhesive roller 104) bottom roller 106 in sufficient frictional contact with the top surface of a card being fed for pre-printing cleaning from a feeder to allow passage of a card such as card 116 between a rotating first driver roller 118 and cleaning roller 106 (which rotates by friction) when lid 108 is in a fully closed position during device operation as depicted, for example, in FIG. 15. First drive roller 118 is driven by a motor (not shown) which is mounted in the body of the printer (not shown). Shaft 120 of first driver roller 118 is preferably disposed directly under shaft 110 of bottom card cleaning roller 106 as depicted in FIG. 15 in accordance with the general principles of the present invention to ensure proper operation of card cleaning device 100. Rotating shaft 120 indirectly drives (rotates) bottom cleaning roller 106 which frictionally drives (rotates) top adhesive roller 104 under fully closed lid 108 during device operation enabling continuous cleaning of bottom cleaning roller 106 by top adhesive roller 104. Lower portion 101 of frame 102 is preferably provided at each end with a concave circular notch, such as notches 105, 109 (FIG. 10), which is designed to fit around each end of rotating driver roller shaft 120 (not shown) when card cleaning device 100 is installed for operation in an appropriately configured card printer.

Figure 8:
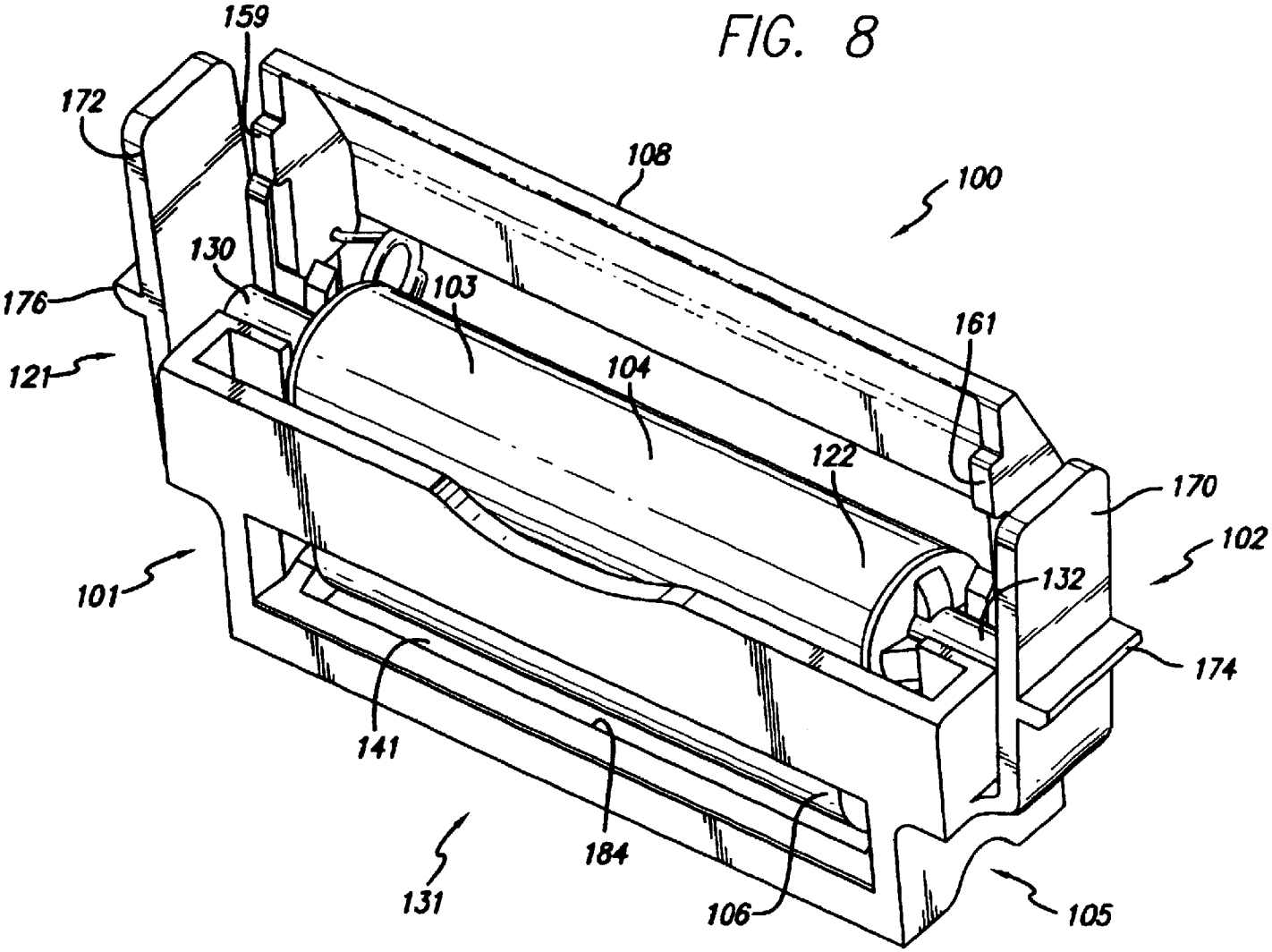
FIG. 8 is a perspective view of a preferred configuration of a card cleaning device with the lid in an open position in accordance with the present invention.
Figure 9:
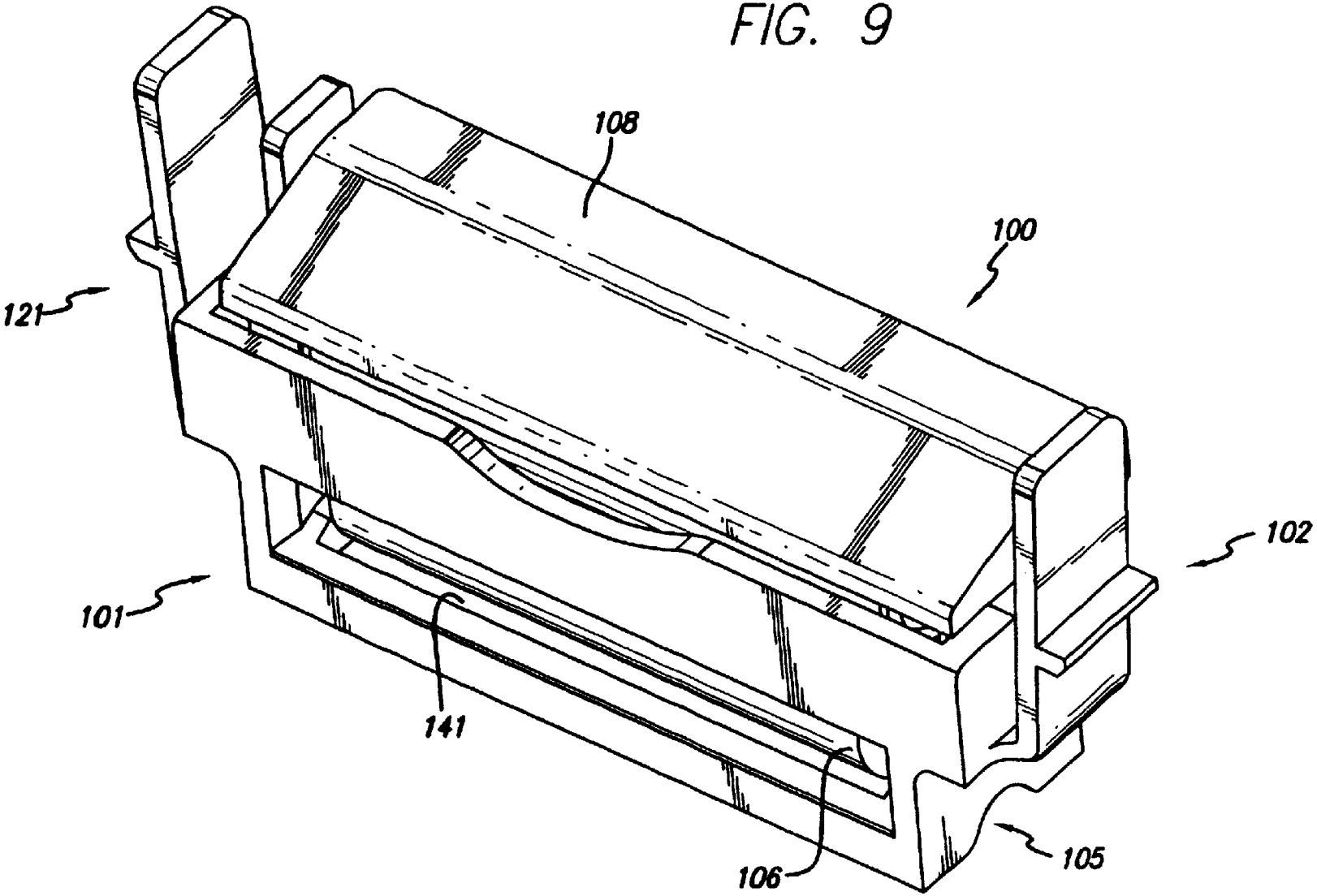
FIG. 9 is a perspective view of the card cleaning device of FIG. 8 with the lid in a closed position in accordance with the present invention.
Figure 19:
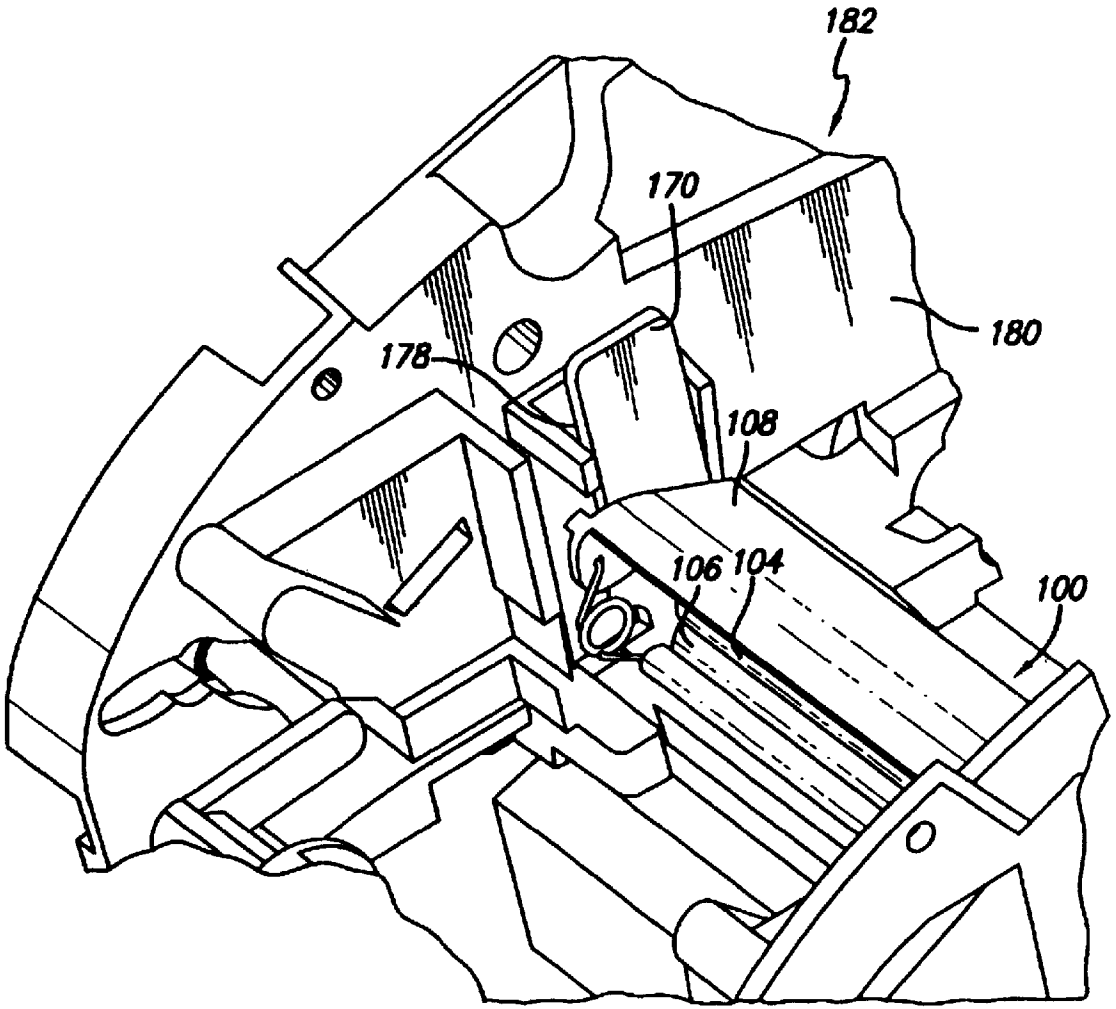
FIG. 19 is a partial perspective view of the card cleaning device of FIG. 8 installed in a printer in accordance with the present invention.

Card cleaning device 100 is preferably removably installed in a card printer via a pair of integral, elongated flexible plastic arms 170, 172 disposed on opposite sides of card cleaning device 100 as depicted, for example, in FIG. 8. Each elongated flexible arm (170, 172) is provided on the outside with an integral outwardly projecting horizontal bar, such as bar 174 on arm 170 and bar 176 on arm 172 (FIG. 8). Each arm is configured to slide removably into a corresponding receptacle, such as receptacle 178 (FIG. 19) provided on the inner wall 180 of a printer frame 182 until bar 174 (or bar 176) snaps inside the receptacle with the outer portion of each arm sticking out (above each receptacle) as illustrated in FIG. 19.

In accordance with one aspect of the present invention, the front side 131 (FIG. 8) or back side 133 (FIG. 12) of card cleaning device 100 may be used for card feeding, i.e., card cleaning device 100 may be installed for operation in printer frame 182 on either side which is an advantage over prior art cleaning cartridges which need to be inserted in a printer only on one side. Card feeding is accomplished via one of two generally rectangular-shaped card feeding slots provided on opposite sides of lower portion 101 of card cleaning device 100, e.g., front feeding slot 184 (FIG. 8) or back feeding slot 186 (FIG. 12) whereby each one of the feeding slots may be used for card feeding depending on the particular orientation of the installed card cleaning device 100.

Figure 13:
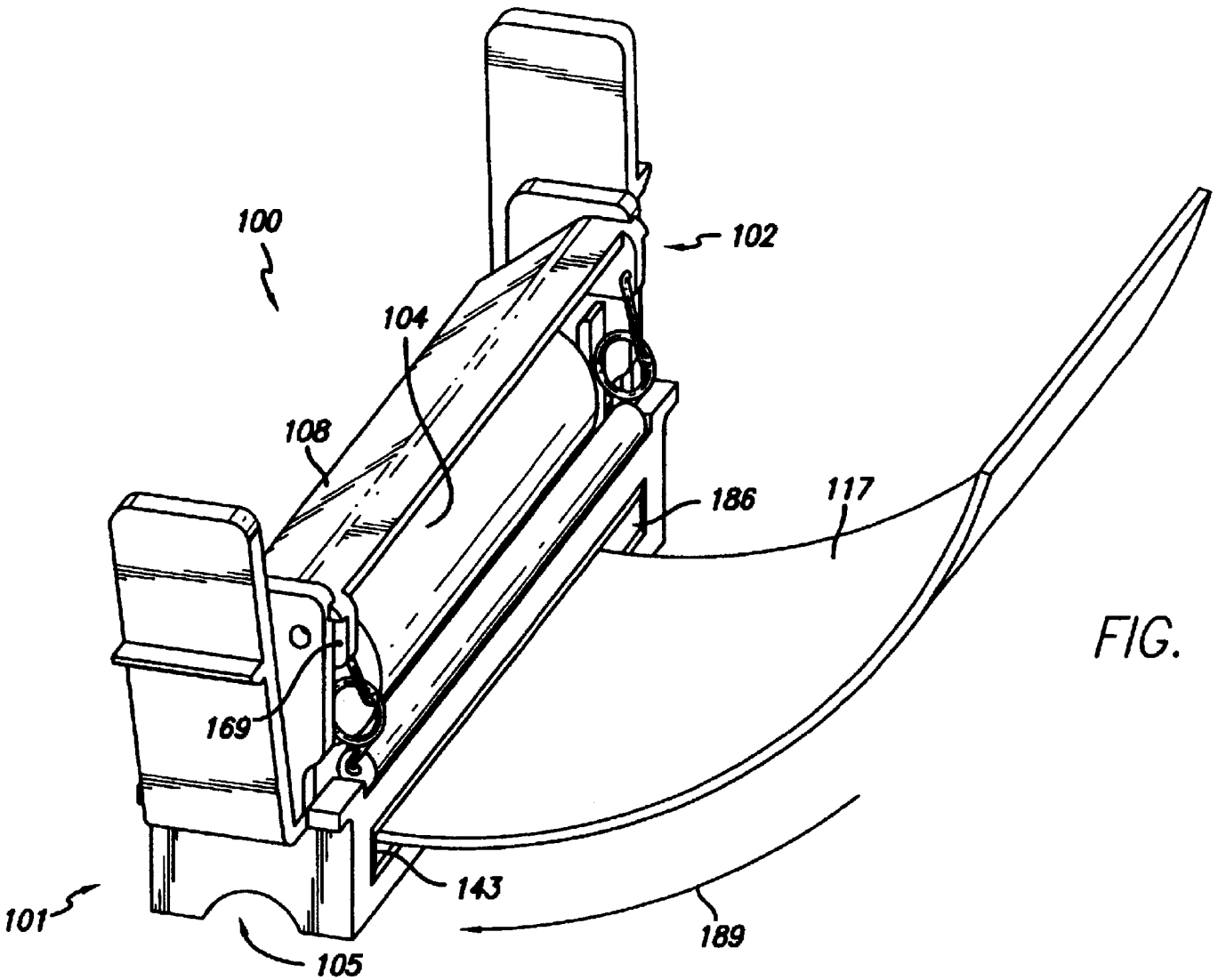
FIG. 13 is a perspective view of a card being fed into the card cleaning device of FIG. 8 in accordance with the present invention.

For example, if back feeding slot 186 is used for feeding as shown in FIGS. 12, 13, the card (e.g., card 117) would enter back feeding slot 186 at an angle (FIG. 16) as shown by directional arrow 188 in FIG. 12, bend slightly at its entering end (FIG. 17) as shown by directional arrow 189 in FIG. 13, then pass horizontally for (pre-printing) cleaning between first driver roller 118 and bottom cleaning roller 106, exit card cleaning device 100 via front slot 184 for printing, return to (i.e., re-enter) card cleaning device 100 after printing via front feeding slot 184 and exit card cleaning device 100 (FIG. 18) again (on the same side it originally entered) via back slot 186 as shown by directional arrow 187 in FIG. 14 on its way out to a card output hopper (not shown).

Figure 16:
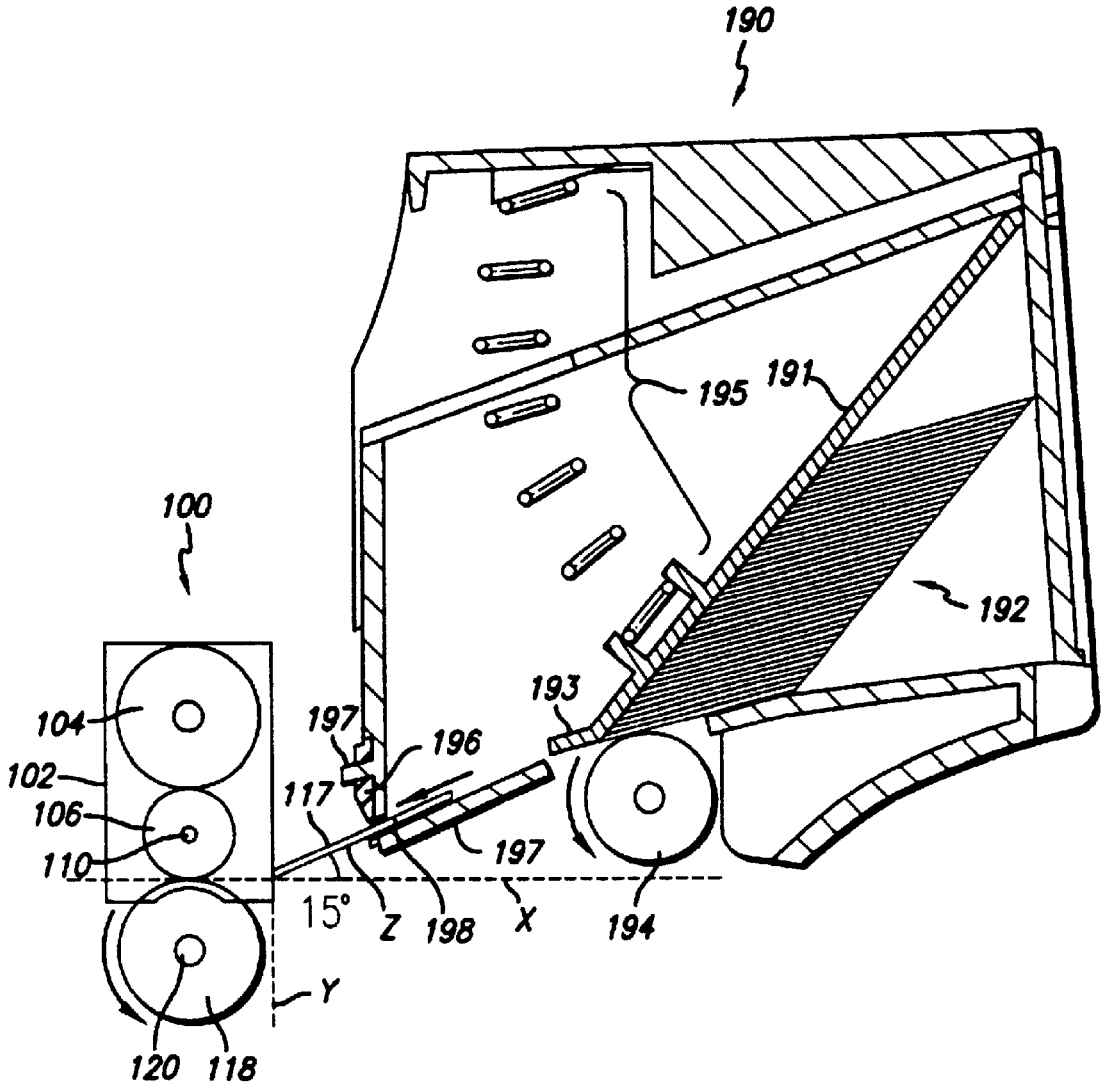
FIG. 16 is a schematic view of a card about to be fed at an angle from a feeder into the card cleaning device of FIG. 8 in accordance with the present invention.

Each card is preferably fed from a card feeder 190 at an angle to save space inside printer frame 182 which allows for the manufacture of a more compact printer which is an advantage over conventional bulky card printers. Card feeder 190 is preferably disposed over the card exit path defined by a horizontal plane X passing centrally between bottom cleaning roller 106 and first driver roller 118 (FIG. 18) as near as possible to card cleaning device 100. The preferred angle of entry is approximately 15° which is measured between horizontal plane X and an entry card path Z of an entering card such as card 117 with entry path Z being respectively at an angle of 75 degrees to a vertical plane Y passing through the outer wall of frame 102 of card cleaning device 100 as generally shown in FIG. 16. Other angles of entry may be utilized depending on the particular printer configuration as long as such angles of entry do not deviate from the intended purpose of the present invention.

Card feeder 190 includes a spring loaded plate 191 which exerts pressure on a staircase-like stack of blank cards 192 with the card exit path defined between a rotating second drive roller 194 and the front end 193 of spring loaded plate 191 as shown in FIG. 16. Plate 191 is spring loaded via a series of coiled springs 195 (FIG. 16) with blank cards being fed to card cleaning device 100 one at a time. A card exit slot 198 is defined between a flexible silicon rubber guide 196 attached to the front of card feeder 190 and the bottom portion 197 of card feeder 190 which allows the passage of only one card at a time as illustrated in FIG. 16. Flexible guide 196 is is adapted to handle any card thickness due to its flexibility and is preferably attached to the front of card feeder 190 by a series of plastic pins (e.g. pin 197—FIG. 16) provided on the front of card feeder 190 which are threaded in corresponding apertures (not shown) provided on rubber guide 196 and then heated and flattened to join the two parts together. In one example, the distance between roller 118 and roller 194 is ¾ of an ISO card (ISO card dimension −87.72±0.25 mm).

Bending of card 117 is achieved naturally by means of flexible guide 196, which pushes on card 117 preventing the card from lifting up on its own, the translation provided by second drive roller 194, and an integral elongated plastic guide plate provided proximate to the bottom portion of each card feeding slot of card cleaning device 100 under bottom cleaning roller 106 (e.g., guide plate 141 in FIG. 8 or guide plate 143 in FIG. 13) which serves as the zone of first contact for the entering end of card 117 and helps prevent premature wear of bottom roller 106. The line of first contact for the entering end of card 117 is, as shown in FIG. 16, preferably defined the intersection of the X, Y planes. Thus, the combination of translation and torsion of 15 degrees allows card 117 to pass between bottom cleaning roller 106 and first drive roller 118 for pre-printing cleaning.

A person skilled in the art would recognize that other materials and/or configurations may be used to produce card cleaning device 100 provided such other materials and/or configurations do not depart from the intended purpose of the present invention. The card cleaning device of FIGS. 8–19 provides a compact, easy roller access solution to the above-identified problems of the prior art and may be incorporated in a variety of card printers.

Figure 20:
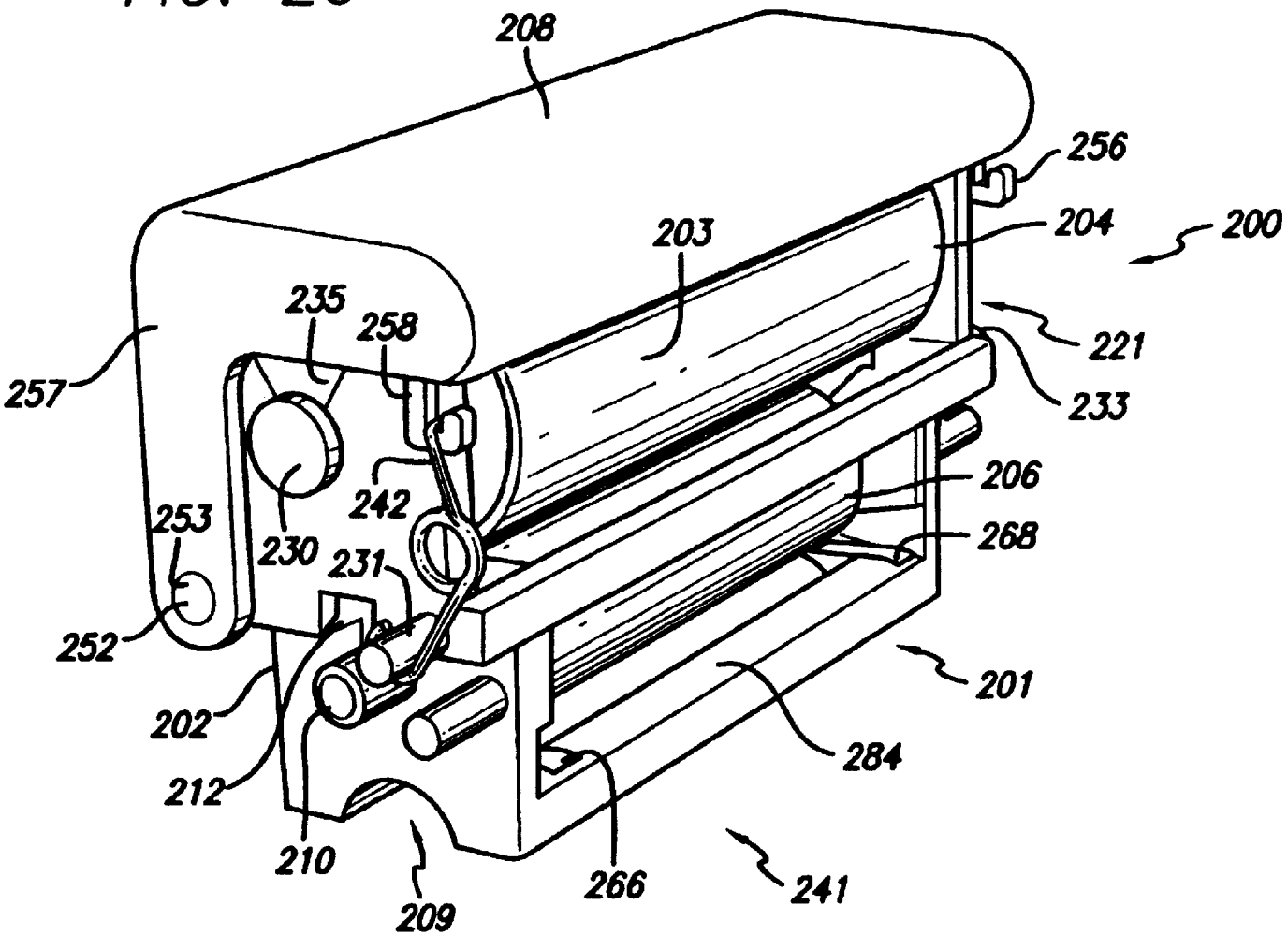
FIG. 20 is a perspective view of a card cleaning device of an alternative design in accordance with the present invention.
Figure 21:
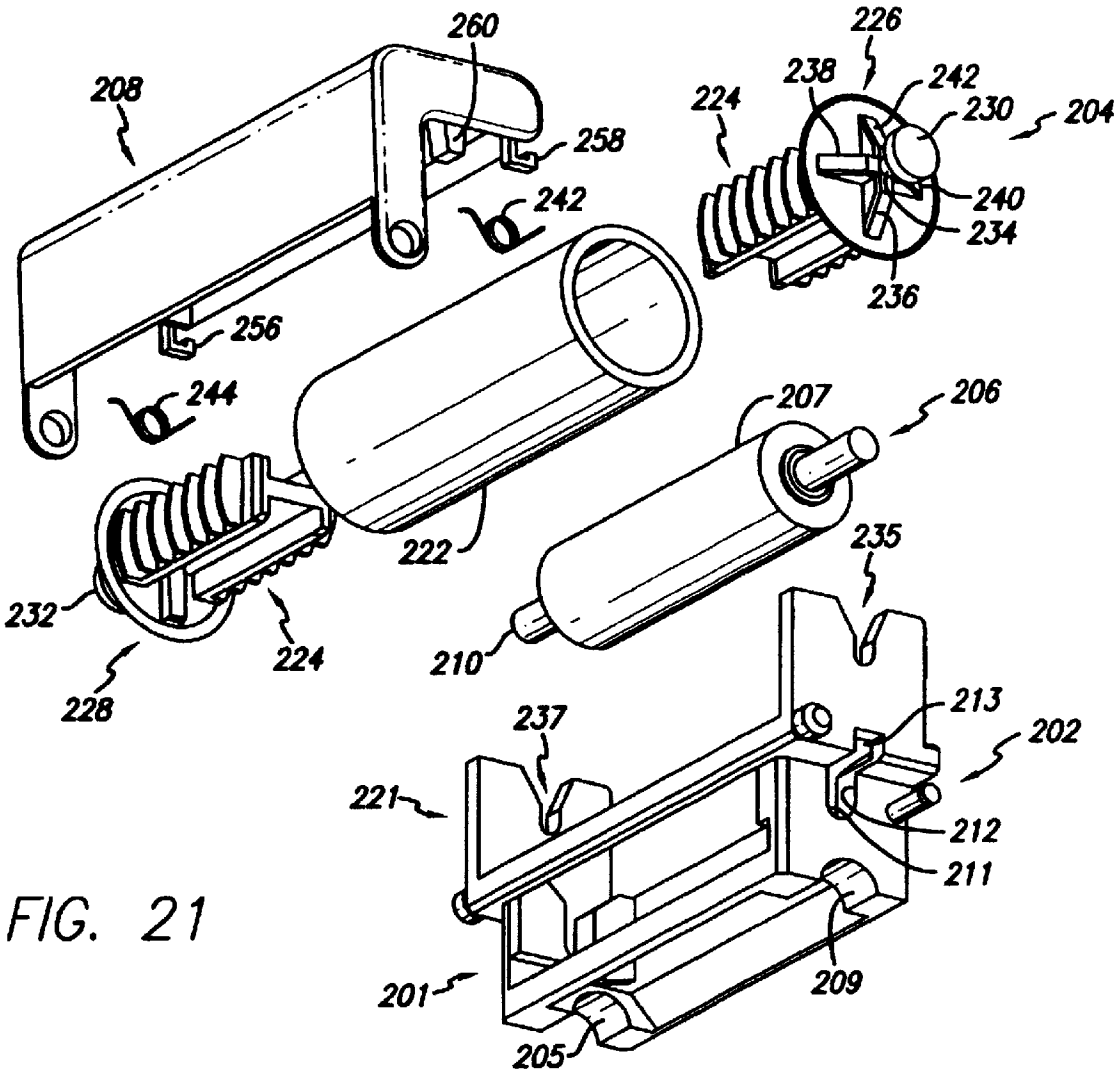
FIG. 21 is an exploded perspective view of the various components of the card cleaning device of FIG. 20.
Figure 22:
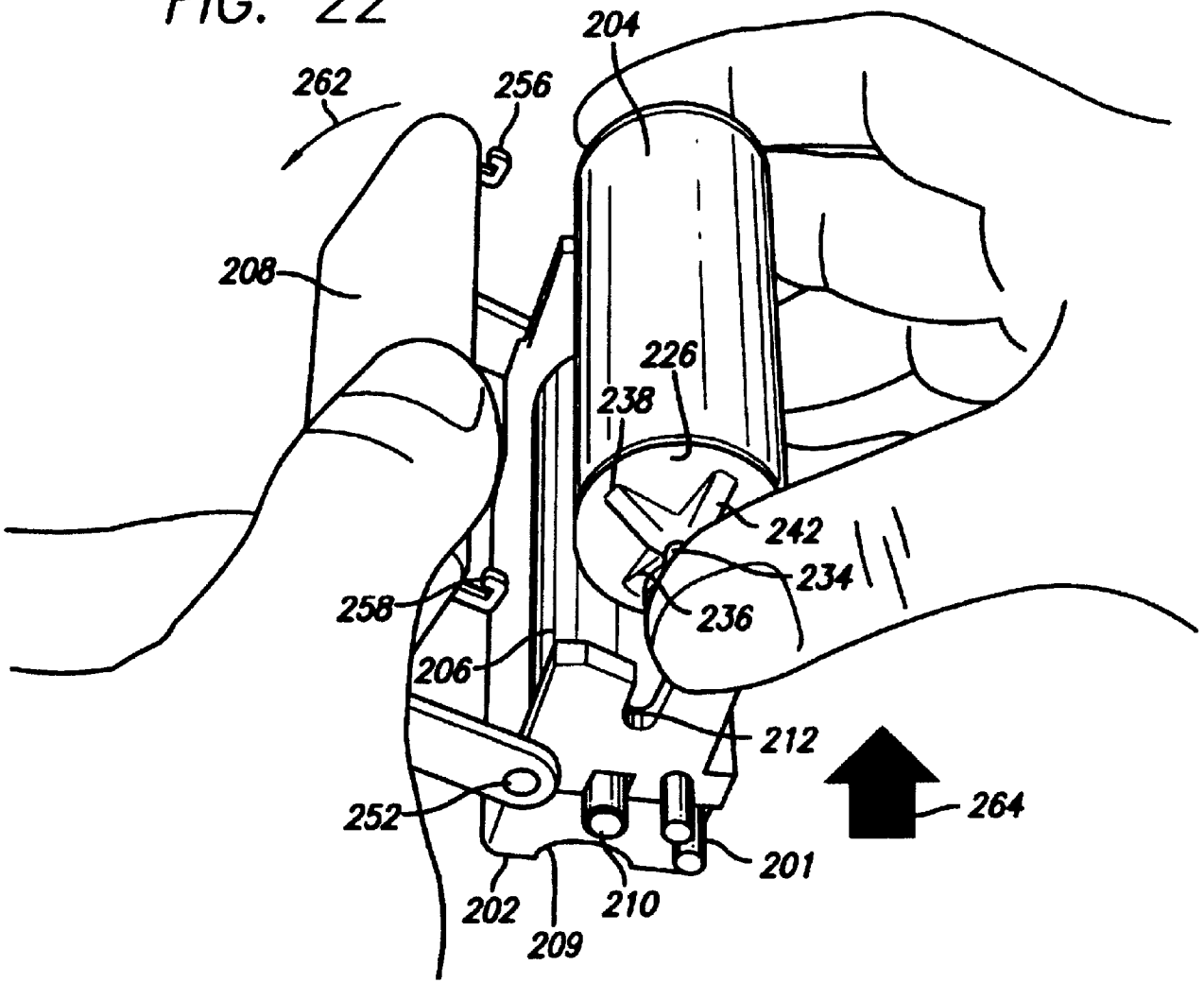
FIG. 22 is a perspective view of a user performing maintenance on the card cleaning device of FIG. 20 in accordance with the present invention.

In accordance with an alternative embodiment of the present invention and as illustrated in FIGS. 20–26, a card cleaning device for use in card printers, generally referred to by reference numeral 200, comprises a plastic frame 202 (FIG. 21) having a lower portion 201 adapted to operatively accommodate a bottom card cleaning roller 206 and an upper portion 221 adapted to operatively accommodate a top adhesive roller 204 on top of card cleaning roller 206 with top adhesive roller 204 being in frictional contact with bottom cleaning roller 206. Card cleaning device 200 also includes a plastic lid 208 pivotally hinged on each side to upper portion 221 of frame 202 to allow easy access to top adhesive roller 204 for maintenance and/or replacement as illustrated in FIG. 22.

Plastic lid 208 includes a pair of oppositely spaced preferably L-shaped arms 255 (FIG. 25) and 257 (FIG. 20) each pivoted at one end to upper portion 221 of frame 202 by a pair of pins 250 (FIG. 25) and 252 (FIG. 20) mounted in aperture 251 (FIG. 25) and aperture 253 (FIG. 20) provided on upper portion 221 of frame 202, respectively. Lid 208 can be manually flipped on one side by the user to facilitate roller maintenance (FIG. 22). A pivot axis 254 is defined through the center of each pin (250, 252) as illustrated in FIG. 24a with the range of angular motion of lid 208 about pivot axis 254 in one example of about 0°–180° with 0° corresponding to a fully closed position of lid 208 as shown in FIGS. 20, 23a, 25a and 26, and 180° corresponding to a fully open position of lid 208 (not shown). Other lid ranges of motion may be utilized provided such other ranges do not depart from the scope of the present invention. Lid 208 is also provided in the front with a pair of integral hooks 258, 256 on each side as depicted, for example, in FIGS. 20, 21.

Bottom card cleaning roller 206 is essentially identical in construction to lower cleaning roller 16 of FIG. 2 and includes a solid annular silicon rubber body 207 (FIG. 21) with a slightly sticky outer surface area for picking up dust particles from a passing card and a solid generally cylindrical shaft 210 disposed inside annular body 207 and projecting on each side (away from body 207) as shown in FIG. 21. Bottom card cleaning roller 206 performs essentially the same function as lower cleaning roller 16 of FIG. 2 during printer operation. Cylindrical shaft 210 mounts at each end for rotation in a generally L-shaped aperture 212 (FIGS. 20, 21) and aperture 214 (FIG. 23a) provided on each side of frame 202 (FIG. 21). Apertures 212, 214 are designed to allow some vertical movement of mounted shaft 210 to accommodate the card thickness but almost no horizontal movement of mounted shaft 210 during printer operation. Each aperture is also adapted to allow easy removal of bottom roller 206 for maintenance as generally illustrated in FIG. 21. Specifically, each aperture has an elongated generally vertical bottom portion, such as bottom portion 211 of aperture 212 (FIG. 21) for accommodating each end of mounted shaft 210 during operation and an elongated generally outwardly curved (away from lower portion 201 of frame 202) horizontal top portion, such as top portion 213 of aperture 212 (FIG. 21) which provides the extra space needed by the user to allow disengagement of each mounted end of shaft 210 from frame 202 if bottom roller 206 needs maintenance or replacement. Before bottom roller 206 can be disengaged from frame 202, top adhesive roller 204 is removed from frame 202 as shown in FIG. 22.

Figure 26:
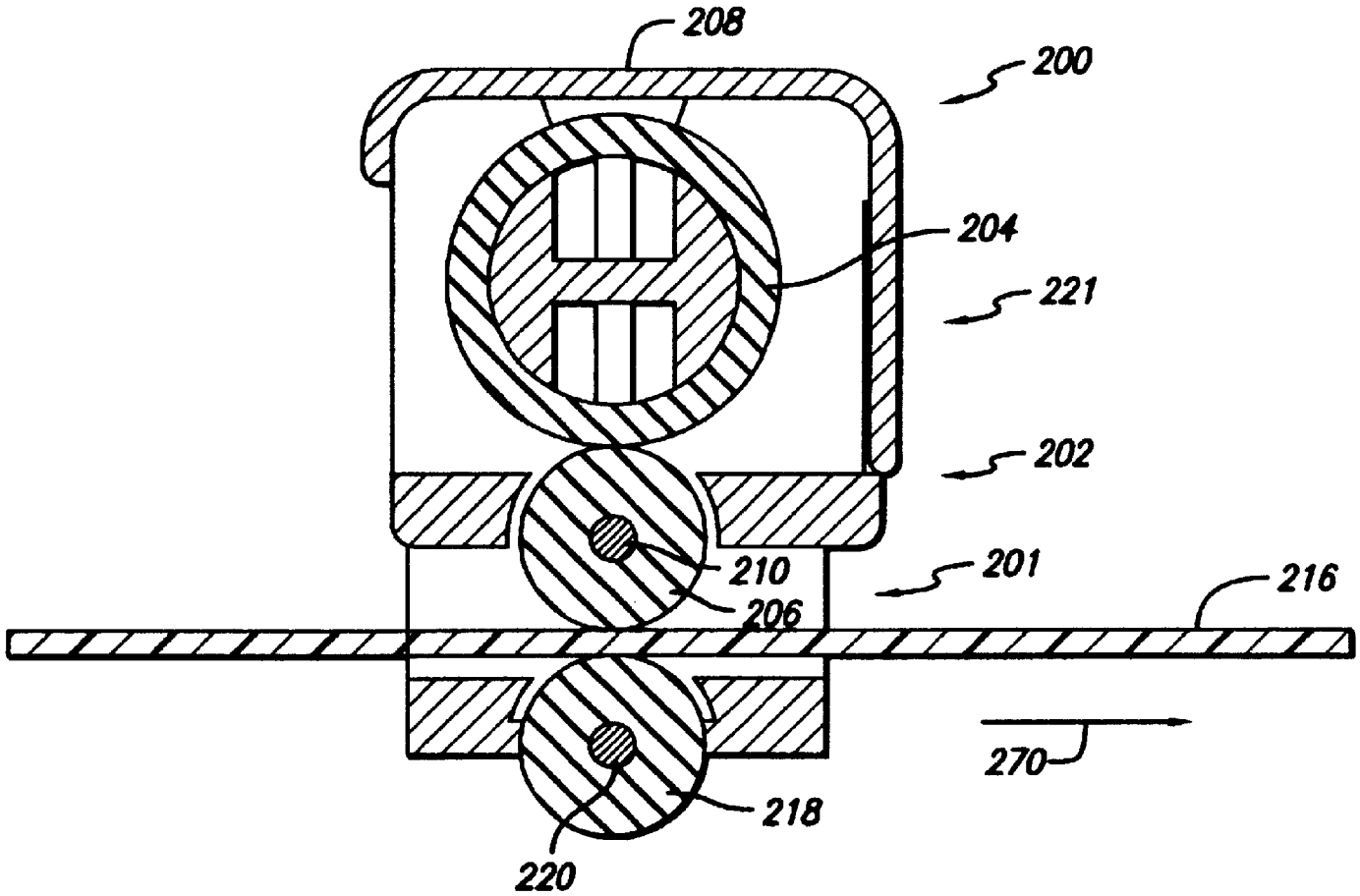
FIG. 26 is a cross-sectional view taken along section line 26—26 of FIG. 25a in accordance with the present invention.

As depicted in FIG. 21, top adhesive roller 204, which has essentially identical construction and function as upper cleaning roller 14 of FIG. 3, comprises generally a tubular body 222 with a removable inner inner two-piece ribbed core 224 of the same type and construction as core 124 of FIG. 10. Core 224 terminates on each side with a generally circular end cap such as end caps 226, 228. Each end cap includes a nob (such as nobs 230, 232) which has a narrow elongated neck (e.g., nob neck 234) supported on four generally triangular shaped racks 236, 238, 240, 242 as illustrated in FIG. 21. Each nob neck (e.g., nob neck 134) mounts for rotation in a corresponding generally V-shaped slot (flared portion of slot facing away from upper portion 221 of frame 202), such as slot 235 or slot 237, provided at one end of frame 202 as shown in FIG. 21 with each nob disposed outside of each slot (FIGS. 20, 23). Slots 235, 237 are designed to allow some vertical movement but almost no horizontal movement of the nob necks once top adhesive roller 204 is mounted for operation directly on top of bottom card cleaning roller 206 as shown in FIG. 26.

The outer surface of tubular body 222 is preferably prewrapped with an adhesive strip layer 203 (FIG. 20) which is essentially identical to the one used in the embodiment of FIGS. 1–7 and is generally stickier than the outer surface of bottom roller 206. Several overlapping layers of adhesive strips (not shown) may also be used if desired. Furthermore, adhesive top roller 204 preferably has a diameter greater than the diameter of bottom card cleaning roller 206 so as to provide a substantially larger effective cleaning surface area for top adhesive roller 204 compared to bottom cleaning card roller 206. The larger effective cleaning surface area allows top adhesive roller 204 to pick up and retain more dust particles than bottom roller 206 which is a significant advantage over prior art card cleaning schemes as bottom roller 206 need not be changed as often as needed in conventional card printers.

Maintenance of top adhesive roller 204 is relatively easy as roller 204 may either be replaced with a new adhesive roller or, if equipped with multiple surface adhesive layers, the user would simply peel off the top-most used adhesive layer to expose a clean adhesive layer underneath. To perform maintenance on top adhesive roller 204, the user flips lid 208 on one side with one hand as shown by directional arrow 262 in FIG. 22 and pulls roller 204 out with the other hand via the outwardly flared portion of each V-shaped slot as shown by directional arrow 264 in FIG. 22. To prevent the nob neck (of top adhesive roller 204) on each side from freely moving in the vertical direction inside slot 212 (or 214) during printing operation, a pair of coiled springs 242, 244 (FIG. 21) are mounted between hooks 258, 256 and a pair of integral cylindrical outwardly projecting posts 231, 233 provided on each side of the outer wall of upper portion 221 of plastic frame 202 as shown in FIG. 20. For example, one end of spring 242 may be wound on cylindrical post 231 with the other end of spring 242 wound on hook 258 as generally shown in FIG. 20.

To maintain pressure on each of the nob necks of top adhesive roller 204 during printer operation, lid 208 is preferably provided internally on each side proximate to each of the L-shaped arm s with an integral generally cube-shaped projection, such as projection 260 (FIG. 21) and is spring loaded as described above via coiled springs 242, 244 (FIGS. 8, 10). When lid 208 is in a fully closed position during device operation coiled springs 242, 244 exert the necessary amount of pressure on the nob necks of top adhesive roller 204 through the body of lid 208 to assure proper operation of top adhesive roller 204. Spring loading of lid 208 maintains (by way of top adhesive roller 204) bottom roller 206 in sufficient frictional contact with the top surface of a card being fed for pre-printing cleaning from a feeder to allow passage of a card such as card 216 between a rotating first driver roller 218 and cleaning roller 206 (which rotates by friction) when lid 208 is in a fully closed position during device operation as depicted, for example, in FIG. 26. First drive roller 218 is driven by a motor (not shown) which is mounted in the body of the printer (not shown). Shaft 220 of first driver roller 218 is preferably disposed directly under shaft 210 of bottom card cleaning roller 206 as depicted in FIG. 26 in accordance with the general principles of the present invention to ensure proper operation of card cleaning device 200. Rotating shaft 220 indirectly drives (rotates) bottom cleaning roller 206 which frictionally drives (rotates) top adhesive roller 204 under fully closed lid 208 during device operation enabling continuous cleaning of bottom cleaning roller 206 by top adhesive roller 204. Lower portion 201 of frame 202 is preferably provided at each end with a concave circular notch, such as notches 205, 209 (FIG. 21), which is designed to fit around each end of rotating driver roller shaft 220 (not shown)

Card cleaning device 200 is preferably removably installed in a molded section (not shown) of an appropriately configured card printer. Card cleaning device 200 fits into the card path by positioning itself directly on drive roller 218 via notch 205. The installed card cleaning device 200 may be easily removed by gently pulling up on the device to remove it from the molded section of the printer In accordance with one aspect of the present invention, the front side 241 (FIG. 20) or back side 243 (FIG. 23a) of card cleaning device 200 may be used for card feeding which is an advantage over prior art cleaning cartridges which need to be inserted in a printer only on one side. Card feeding is accomplished via one of two generally rectangular-shaped card feeding openings provided on opposite sides of lower portion 201 of card cleaning device 200, e.g., front feeding opening 284 (FIG. 20) or back feeding opening 286 (FIG. 23a) whereby each one of the feeding openings may be used for card feeding depending on the particular orientation of the installed card cleaning device 200.

Figures 23A, 23B:
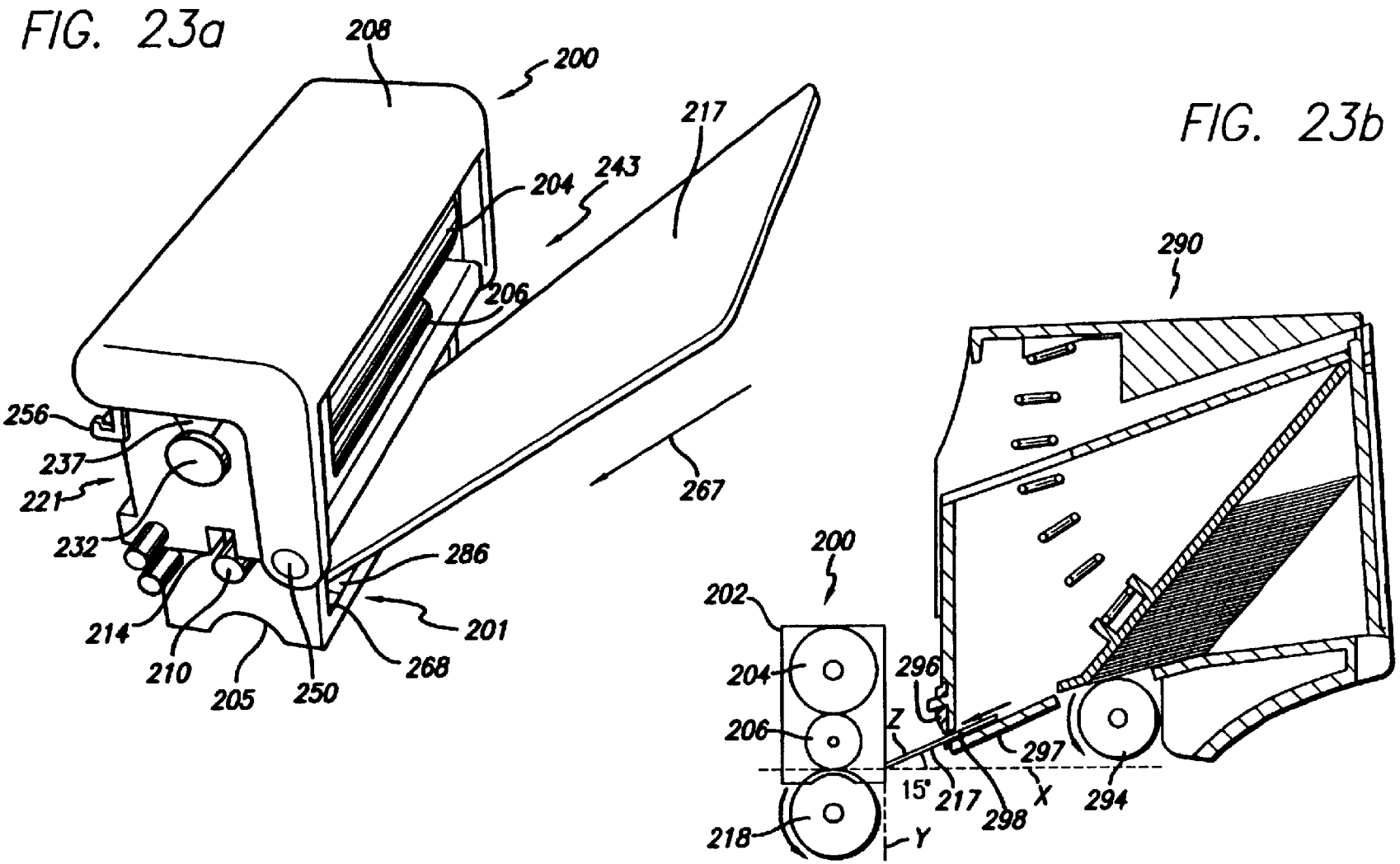
FIG. 23a is a perspective view of a card about to be fed at an angle into the card cleaning device of FIG. 20 in accordance with the present invention.
FIG. 23b is a schematic view of a card about to be fed at an angle from a feeder into the card cleaning device of FIG. 20 in accordance with the present invention.
Figures 24A, 24B:
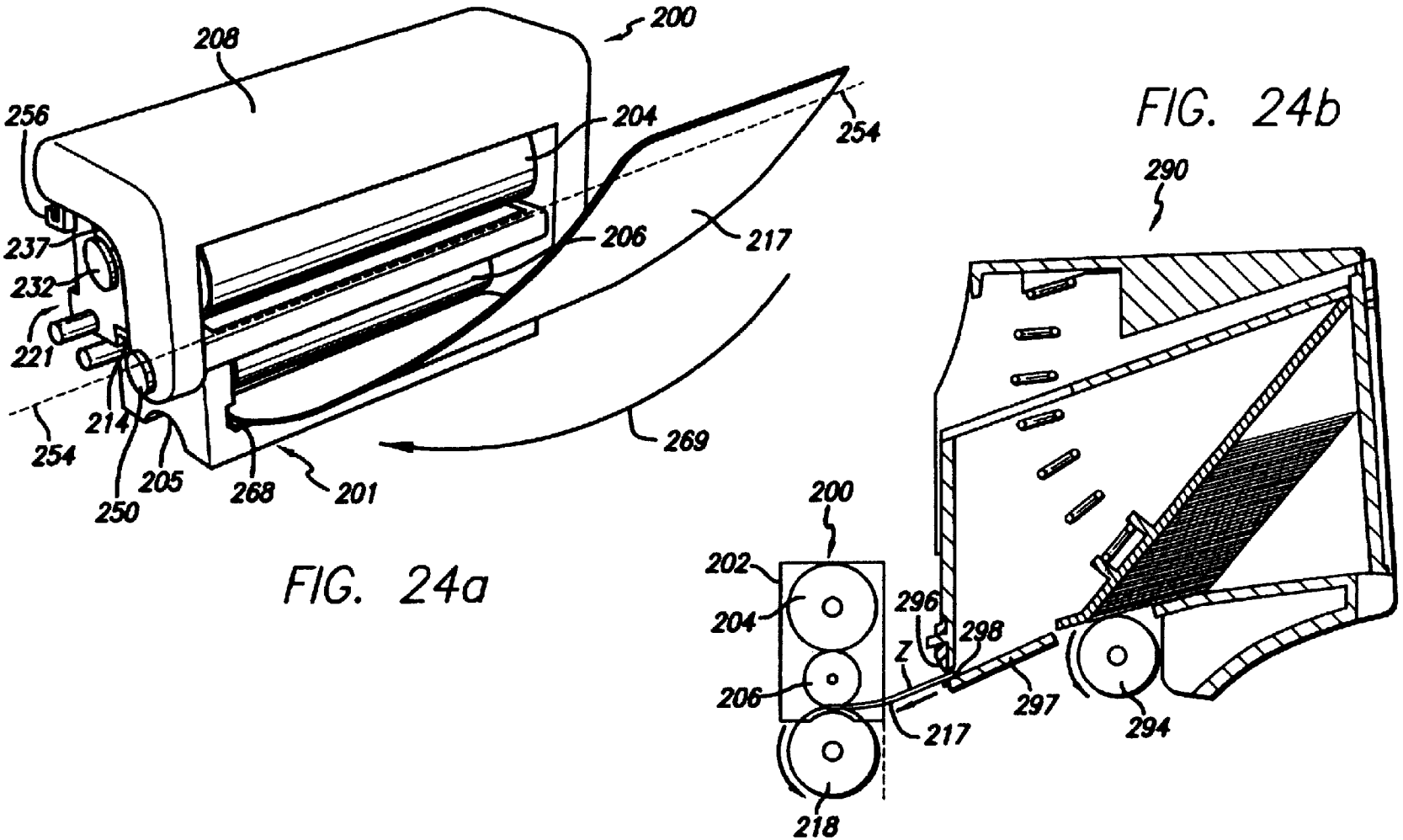
FIG. 24a is a perspective view of a card being fed into the card cleaning device of FIG. 20 in accordance with the present invention.
FIG. 24b is a schematic view of a card being fed from a feeder into the card cleaning device of FIG. 20 in accordance with the present invention.
Figure 25B:
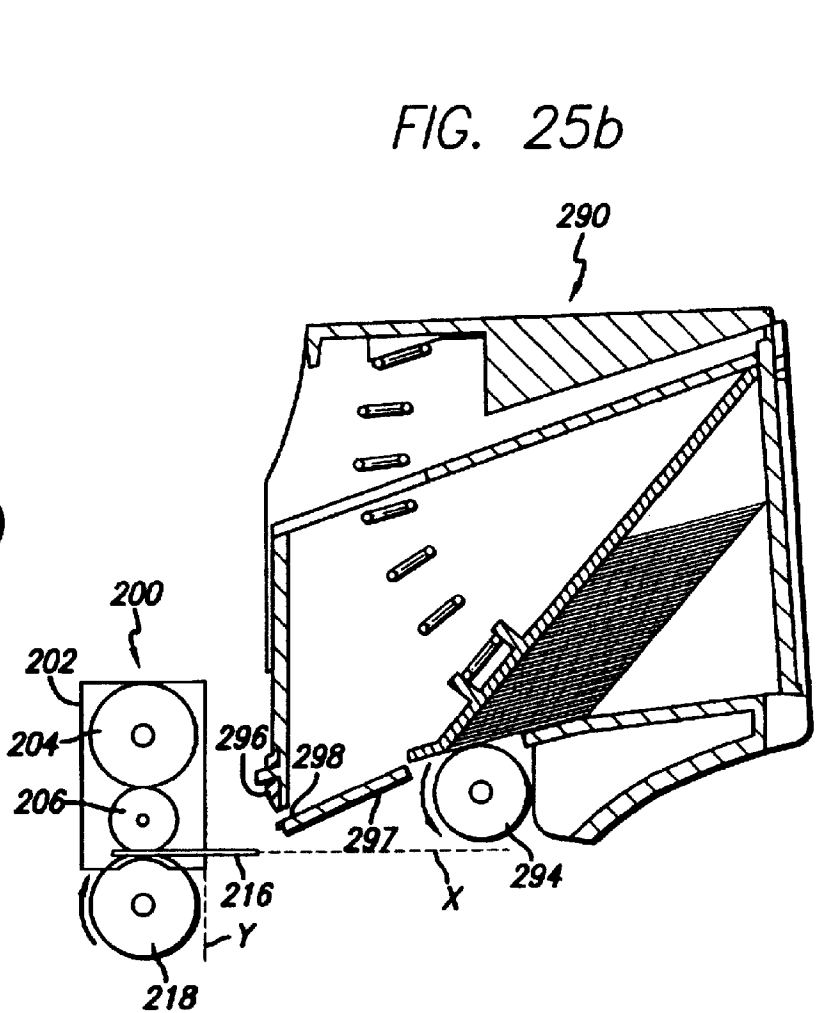
FIG. 25b is a schematic view of a printed card exiting the card cleaning device of FIG. 20 and about to pass under a feeder in accordance with the present invention.
Figure 25A:
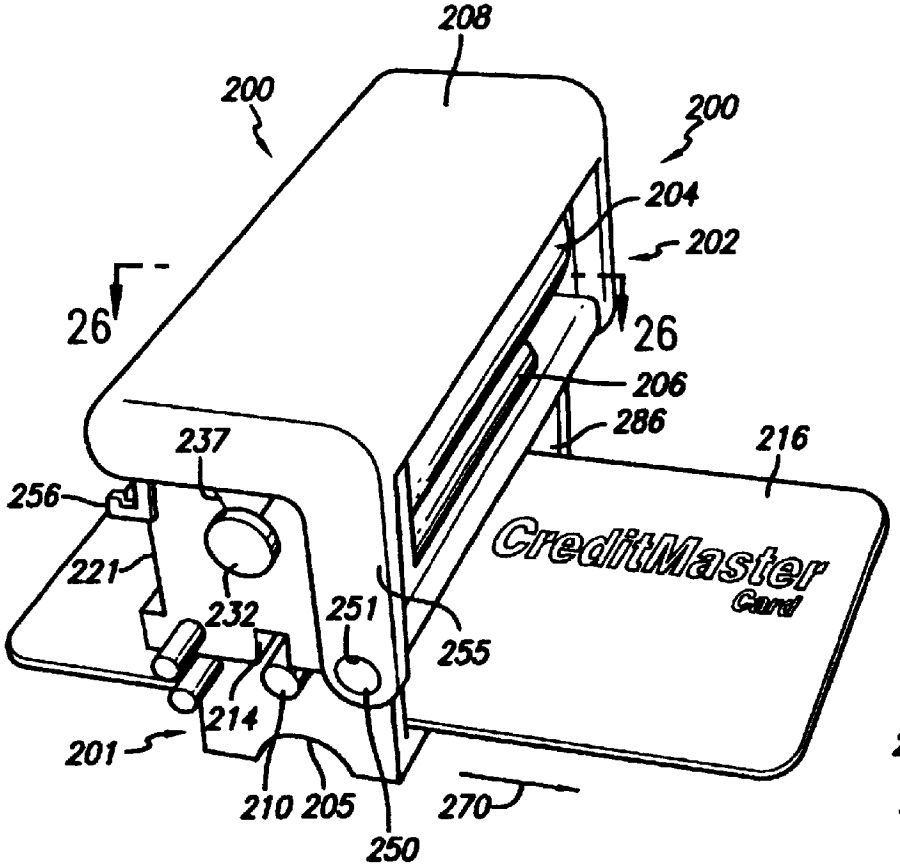
FIG. 25a is a perspective view of a printed card exiting the card cleaning device of FIG. 20 in accordance with the present invention.

For example, if back feeding opening 286 is used for feeding as shown in FIGS. 23a, 24a, the card (e.g., card 217) would enter back feeding opening 286 at an angle (FIG. 23b) as shown by directional arrow 267 in FIG. 23a, bend slightly at its entering end (FIG. 24b) as shown by directional arrow 269 in FIG. 24a, then pass horizontally for (pre-printing) cleaning between first driver roller 218 and bottom cleaning roller 206, exit card cleaning device 200 via front opening 284 for printing, return to (i.e., re-enter) card cleaning device 200 after printing via front feeding opening 284 and exit card cleaning device 200 (FIG. 25b) again (on the same side it originally entered) via back feeding opening 286 as shown by directional arrow 270 in FIG. 25a on its way out to a card output hopper (not shown).

Each card is preferably fed from a card feeder 290 (FIG. 23b) at an angle to save internal printer space allowing for the manufacture of a more compact printer which is an advantage over conventional bulky card printers. Card feeder 290 is preferably disposed over the card exit path defined by a horizontal plane X passing centrally between bottom cleaning roller 206 and first driver roller 218 (FIG. 23b) as near as possible to card cleaning device 200. In one example, the distance between roller 218 and roller 294 is ¾ of an ISO card (ISO card dimension –87.72±0.25 mm). The preferred angle of entry is approximately 15° which is measured between horizontal plane X and a card entry path Z of an entering card such as card 217 with card entry path Z being respectively at an angle of 75 degrees to a vertical plane Y passing through the outer wall of frame 202 of card cleaning device 200 as generally shown in FIG. 23b. Other angles of entry may be utilized depending on the particular printer configuration as long as such angles of entry do not deviate from the intended purpose of the present invention.

Figure 17:
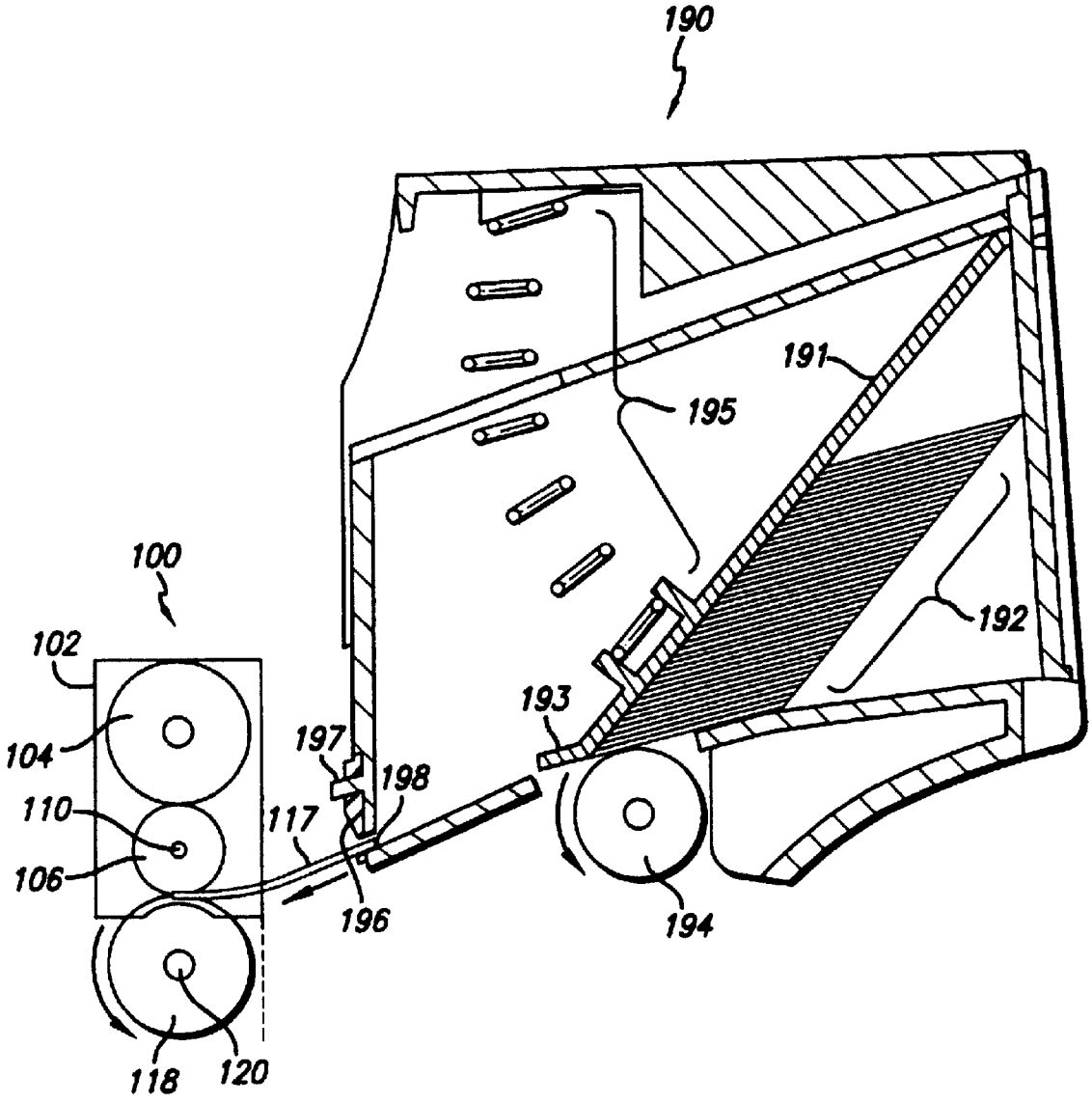
FIG. 17 is a schematic view of a card being fed from a feeder into the card cleaning device of FIG. 8 in accordance with the present invention.
Figure 18:
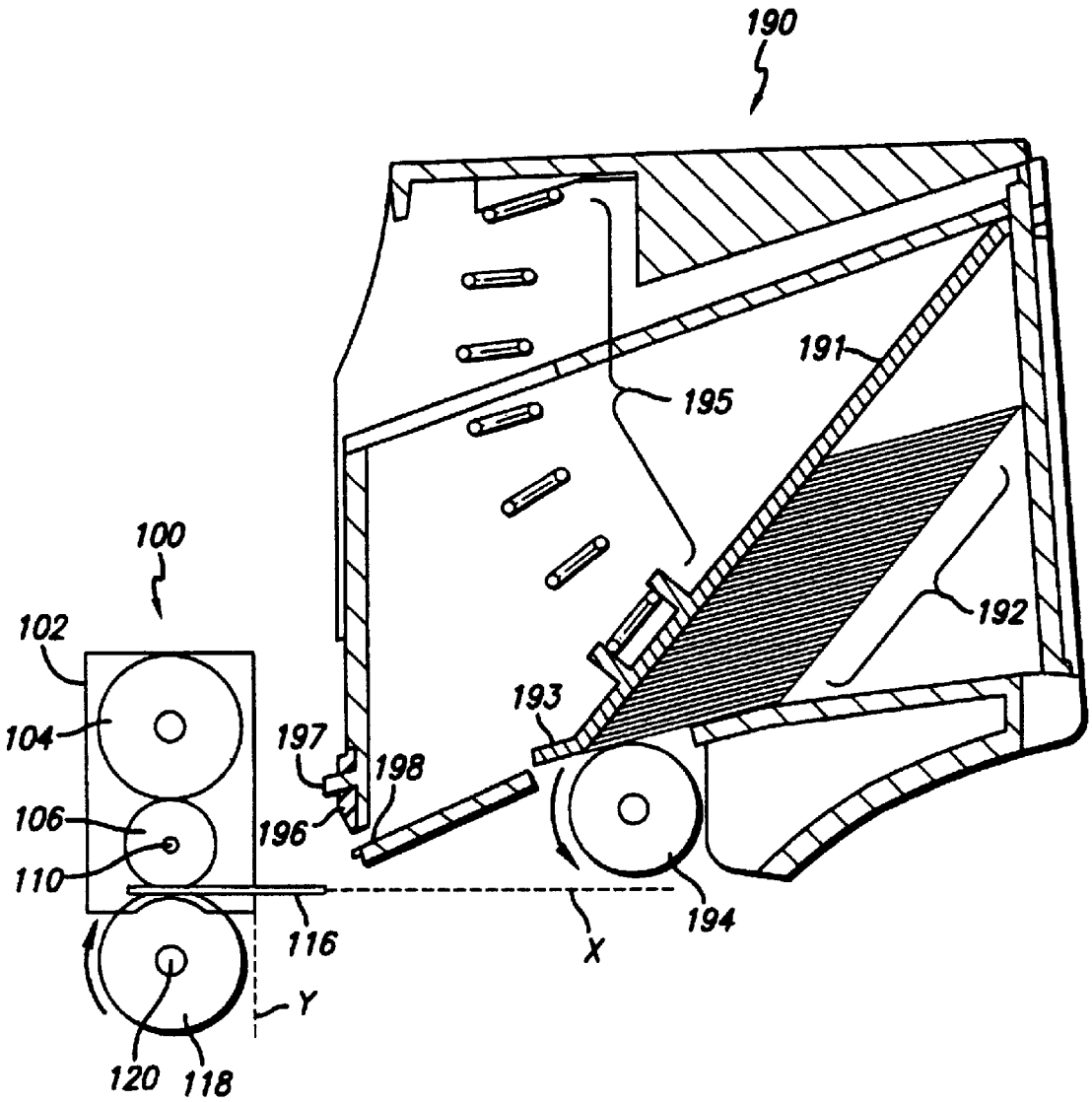
FIG. 18 is a schematic view of a printed card exiting the card cleaning device of FIG. 8 and about to pass under a feeder in accordance with the present invention.

The construction and function of card feeder 290 is essentially identical to card feeder 190 of FIGS. 16–18. A card exit opening 298 is defined between a flexible silicon rubber guide 296 attached to the front of card feeder 290 and the bottom portion 297 of card feeder 290 which allows the passage of only one card at a time as illustrated in FIG. 23b. The function of flexible guide 296 and the means of attachment to feeder 290 is identical to flexible guide 196 of FIGS. 16–18.

Bending of card 217 is achieved naturally by means of flexible guide 296, which pushes on card 217 preventing the card from lifting up on its own, the translation provided by a second drive roller 294 and a pair of integral symmetrically spaced plastic card entry guides 266, 268 (FIGS. 20, 24a) provided on lower portion 201 of frame 202 within each card feeding opening under bottom roller 206 which serve as the zone of first contact for the entering end of card 217 and help prevent premature wear of bottom roller 206. The line of first contact for the entering end of card 217 is, as shown in FIG. 23a, preferably defined by the intersection of the X, Y planes. Thus, the combination of translation and torsion of 15 degrees allows card 217 to pass between bottom cleaning roller 206 and first drive roller 218 for pre-printing cleaning.

A person skilled in the art would recognize that other materials and/or configurations may be used to produce card cleaning device 200, provided such other materials and/or configurations do not depart from the intended purpose of the present invention. Furthermore, the above-described card cleaning device of FIGS. 20–26 provides a compact, low cost, easy roller access solution to the above-identified problems of the prior art and may be incorporated in a variety of card printers.

While the present invention has been described in detail with regards to the preferred embodiments, it should be appreciated that various modifications and variations may be made in the present invention without departing from the scope or spirit of the invention. For example, the novel card cleaning device of the present invention may be installed in a card printer in other ways as long as there is no departure from the intended purpose of the present invention. Also, projection 260 of FIG. 21 may be eliminated with lid 208 modified similar to lid 108 of FIGS. 8–19. In this regard, it is important to note that practicing the invention is not limited to the applications described hereinabove. Many other applications and/or alterations may be utilized provided that they do not depart from the intended purpose of the present invention.

It should be appreciated by a person skilled in the art that features illustrated or described as part of one embodiment can be used in another embodiment to provide yet another embodiment such that the features are not limited to the specific embodiments described above. Thus, it is intended that the present invention cover such modifications, embodiments and variations as long as they come within the scope of the appended claims and their equivalents.

What is claimed is:

1. A card cleaning device for use in an image forming machine, comprising:

(a) a housing adapted to be removably coupled to said image forming machine;

(b) a first cleaning member removably coupled to said housing and adapted to clean a card being fed at an angle relative to said housing, said housing being adapted to receive said card at an angle; and (c) a second cleaning member removably coupled to said housing and adapted to clean said first cleaning member during machine operation.

2. The card cleaning device of claim 1, wherein said second cleaning member is in frictional contact with said first cleaning member and adapted to clean said first cleaning member during machine operation.

3. The card cleaning device of claim 1, wherein said first cleaning member includes a first roller having a shaft removably coupled to said housing and said second cleaning member includes a second roller having a core removably coupled to said housing, said second roller being in frictional contact with said first roller and adapted to clean said first roller during machine operation.

4. The card cleaning device of claim 3, further comprising a lid rotatably coupled to said housing substantially over said second roller for rotating between an open position for roller maintenance and a closed position during machine operation, said lid adapted to contact said core of said second roller when said lid is in said closed position.

5. The card cleaning device of claim 4, further comprising at least one spring operatively coupled between said lid and said housing for spring loading said lid, said spring-loaded lid exerting pressure on said core of said second roller when said lid is in said closed position, said pressure being transferred to said first roller as a result of said frictional contact between said first and second rollers.

6. The card cleaning device of claim 5, further comprising a first drive roller disposed substantially under said first roller and in frictional contact with a card being fed for passing said card under said first roller for card cleaning.

7. The card cleaning device of claim 3, further comprising means for guiding the entry of a card being fed at an angle relative to said housing.

8. The card cleaning device of claim 7, wherein said entry guiding means includes at least one card entry guide coupled to said housing substantially under said first roller for establishing a zone of first contact for said card and for preventing premature wear of said first roller during card feeding.

9. A card cleaning system for use with an image forming machine, comprising:

(a) a housing adapted to be removably coupled to said image forming machine;

(b) a first cleaning member removably coupled to said housing and adapted to clean a card being fed at an angle relative to said housing along a card entry path, said housing being adapted to receive said card at an angle, said angle substantially defined between said card entry path and a card exit path relative to said housing;

(c) means for feeding said card at an angle relative to said housing; and (d) a second cleaning member removably coupled to said housing and adapted to clean said first cleaning member during machine operation.

10. The card cleaning system of claim 9, wherein said second cleaning member is in frictional contact with said first cleaning member and adapted to clean said first cleaning member during machine operation.

11. The card cleaning system of claim 9, wherein said first cleaning member includes a first roller having a shaft removably coupled to said housing and said second cleaning member includes a second roller having a core removably coupled to said housing, said second roller being in frictional contact with said first roller and adapted to clean said first roller during machine operation.

12. The card cleaning device of claim 11, further comprising a lid rotatably coupled to said housing substantially over said second roller for rotating between an open position for roller maintenance and a closed position during machine operation, said lid adapted to contact said core of said second roller when said lid is in said closed position.

13. The card cleaning device of claim 12, further comprising at least one spring operatively coupled between said lid and said housing for spring loading said lid, said spring-loaded lid exerting pressure on said core of said second roller when said lid is in said closed position, said pressure being transferred to said first roller as a result of said frictional contact between said first and second rollers.

14. The card cleaning device of claim 13, further comprising a first drive roller disposed substantially under said first roller and in frictional contact with a card being fed for passing said card under said first roller for card cleaning.

15. The card cleaning device of claim 11, wherein said card feeding means includes a card feeder disposed proximate to said housing substantially over said card entry path, a second drive roller disposed substantially under said card feeder for translating said card along said card entry path and at least one card entry guide coupled to said housing substantially under said first roller for establishing a zone of first contact for an entering card and for preventing premature wear of said first roller during card feeding, said card feeder mechanism adapted to bend said card upon card contact with said at least one card entry guide to enable card feeding at an angle relative to said housing.

*16. For use in a printer or other system forming images on cards or other such media, a replaceable media cleaning cartridge comprising:*

*a. a first cleaning component structured and arranged to engage and present to a moving media unit being cleaned, a changing first contact surface area; and*

*b. a second cleaning component structured and arranged to engage and present to said first cleaning component, a changing second contact surface area, whereby to clean the first cleaning component;*

*c. the tackiness of said second contact surface area being greater than the tackiness of said first contact surface area which in turn is greater than the tackiness of a media unit such that said first contact surface area adhesively attracts particles from a media unit being cleaned, and said second contact surface area adhesively attracts particles from said first contact surface area.*

*17. The media cleaning cartridge of claim 16 wherein said first cleaning component comprises a roller.*

*18. The media cleaning cartridge of claim 16 wherein said second cleaning component comprises a roller.*

*19. The media cleaning cartridge of claim 16 wherein said second cleaning component is structured for quick removal from said cartridge.*

*20. The media cleaning cartridge of claim 16 wherein said first cleaning component is structured for quick removal from said cartridge.*

*21. The media cleaning cartridge of claim 16 wherein both of said first and second cleaning components are structured for quick removal from said cartridge.*

*22. The media cleaning cartridge of claim 16 wherein said second contact surface is replaceable.*

*23. The media cleaning cartridge of claim 16 wherein said cartridge has a frame which supports said first and second cleaning components, said frame being configured such that at least said first cleaning component is supported in a slot in said frame.*

*24. The media cleaning cartridge of claim 16 wherein said cartridge has a frame which supports said first and second cleaning components, said frame being configured such that at least said second cleaning component is supported in a slot in said frame.*

*25. The media cleaning cartridge of claim 16 wherein said cartridge has a frame which supports said first and second cleaning components, said frame being configured such that said first and second cleaning components are supported in one or more slots in said frame.*

*26. The media cleaning cartridge of claim 16 wherein the total second contact surface area on said second cleaning component is greater than the total first contact surface area on said first cleaning component.*

*27. The media cleaning cartridge of claim 16 wherein said second cleaning component comprises a disposable tube having said second contact surface area and a core upon which said tube is mounted.*

*28. The media cleaning cartridge of claim 27 wherein said core comprises a pair of end caps, one positioned in each end of said tube.*

*29. For use in a printer or other system forming images on cards or other such media, a replaceable media cleaning cartridge comprising:*

*a. a first cleaning component structured and arranged to engage and present to a moving media unit being cleaned, a changing first contact surface area; and*

*b. a second cleaning component structured and arranged to engage and present to said first cleaning component, a changing second contact surface area;*

*c. the tackiness of said second contact surface area being greater than the tackiness of said first contact surface area which in turn is greater than the tackiness of a media unit such that said first contact surface area adhesively attracts particles from a media unit being cleaned, and said second contact surface area adhesively attracts particles from said first contact surface area, wherein said cartridge includes a resilient member adapted to bias said second cleaning component into engagement with said first cleaning component.*

*30. For use in a printer or other system forming images on cards or other such media, a replaceable media cleaning cartridge comprising:*

*a. a first cleaning component structured and arranged to engage and present to a moving media unit being cleaned, a changing first contact surface area; and*

*b. a second cleaning component structured and arranged to engage and present to said first cleaning component, a changing second contact surface area;*

*c. the tackiness of said second contact surface area being greater than the tackiness of said first contact surface area which in turn is greater than the tackiness of a media unit such that said first contact surface area adhesively attracts particles from a media unit being cleaned, and said second contact surface area adhesively attracts particles from said first contact surface area,*

*wherein said second cleaning component is mounted above said first cleaning component such that gravity forces said first cleaning component against said media unit.*

*31. For use in a printer or other system forming images on cards or other such media, a replaceable media cleaning*

*cartridge adapted to be received in the system and configured to support one or more cleaning components structured and arranged to engage and present to a moving media unit being cleaned a changing tacky contact surface area, wherein said cartridge comprises:*

*a. a first cleaning component structured and arranged to engage and present to the moving media unit being cleaned, a changing first contact surface area; and*

*b. a second cleaning component structured and arranged to engage and present to said first cleaning component, a changing second contact surface area.*

*32. The media cleaning cartridge of claim 31 including mounting structures adapted for quick installation of the cartridge in the system.*

*33. The media cleaning cartridge of claim 31 wherein said cartridge has a frame which supports said one or more cleaning components and is configured to define a media access opening on a first face of said cartridge.*

*34. The media cleaning cartridge of claim 33 wherein said opening comprises a window with at least one beveled edge.*

*35. The media cleaning cartridge of claim 33 wherein said cartridge is adapted to receive a media unit to be cleaned through said opening along an input path having a predetermined acute entry angle relative to horizontal.*

*36. The media cleaning cartridge of claim 35 wherein said acute entry angle is about 15 degrees.*

*37. The media cleaning cartridge of claim 36, wherein said cartridge defines a media exit opening on a second face of said cartridge having an exit angle that is substantially horizontal.*

*38. The media cleaning cartridge of claim 35 wherein said cartridge is adapted to effect a media unit which has been cleaned through said opening along an output path having a predetermined exit angle which is different than said entry angle relative to horizontal.*

*39. For use in a printer or other system forming images on cards or other such media, a replaceable media cleaning cartridge adapted to be received in the system and configured to support one or more cleaning components structured and arranged to engage and present to a moving media unit being cleaned a changing tacky contact surface area, said cartridge is bidirectionally effective and adapted to receive a media unit on either of opposed first and second faces thereof.*

*40. For use in a printer or other system forming images on cards or other such media, a replaceable media cleaning cartridge adapted to be received in the system and configured to support one or more cleaning components structured and arranged to engage and present to a moving media unit being cleaned a changing tacky contact surface area, the media cleaning cartridge including mounting structures adapted for quick installation of the cartridge in the system, wherein said mounting structures include a latch.*

*41. For use in a printer or other system forming images on cards or other such media, a replaceable media cleaning cartridge adapted to be received in the system and configured to support one or more cleaning components structured and arranged to engage and present to a moving media unit being cleaned a changing tacky contact surface area, including at least one upstanding tab adapted to be manually grasped for installation of the cartridge into the system.*

*42. For use in a printer or other system forming images on cards or other such media, a replaceable media cleaning cartridge adapted to be received in the system and configured to support one or more cleaning components structured and arranged to engage and present to a moving media unit being cleaned a changing tacky contact surface area, wherein said cartridge includes an upstanding arm on each side of the cartridge.*

*43. The media cleaning cartridge of claim 42 wherein said arms are resilient and adapted to be flexed toward each other to facilitate installation of the cartridge in the system.*

*44. The media cleaning cartridge of claim 43 wherein said arms each have a detent provision configured to cooperate with detent provisions in the system to locate the cartridge in an operative position in the system.*

*45. For use in a printer or other system forming images on cards or other such media, a replaceable media cleaning cartridge adapted to be received in the system and configured to support one or more cleaning components structured and arranged to engage and present to a moving media unit being cleaned a changing tacky contact surface area, including alignment members on opposed sides of the cartridge configured to be received in cooperating alignment guides in the system.*

*46. The media cleaning cartridge of claim 45 wherein said alignment members are structured to be received in slots in the system.*

*47. For use in a printer or other system forming images on cards or other such media, a replaceable media cleaning cartridge adapted to be received in the system and configured to support one or more cleaning components structured and arranged to engage and present to a moving media unit being cleaned a changing tacky contact surface area, wherein said cartridge has a pivoted lid.*

*48. The media cleaning cartridge of claim 47 including a resilient member mounted to bias said lid to a closed position.*

*49. The media cleaning cartridge of claim 48 wherein one of said one or more cleaning components comprises a roller having an axle, and wherein said lid engages said axle to transfer said bias to said one of said one or more cleaning components.*

*50. A printer or other system forming images on cards or other such media, comprising:*

*a. a chassis;*

*b. a media feed supported by said chassis; and*

*c. a replaceable media cleaning cartridge supported by said chassis adjacent the media feed, said cartridge comprising:*

*i. a first cleaning component structured and arranged to engage and present to a moving media unit being cleaned, a changing first contact surface area; and*

*ii. a second cleaning component structured and arranged to engage and present to said first cleaning component, a changing second contact surface area;*

*iii. the tackiness of said second contact surface area being greater than the tackiness of said first contact surface area which in turn is greater than the tackiness of a media unit such that said first contact surface area adhesively attracts particles from a media unit being cleaned and said second contact surface area adhesively attracts particles from said first surface area.*

*51. The system of claim 50 wherein said first cleaning component comprises a roller.*

*52. The system of claim 50 wherein said second cleaning component comprises a roller.*

*53. The system of claim 50 wherein said second cleaning component is adapted for quick removal from said cartridge.*

*54. The system of claim 50 wherein said second contact surface is replaceable.*

*55. The system of claim 50 wherein said cartridge has a frame which supports said first and second cleaning*

*components, said frame being configured such that at least said second cleaning component is supported in slots in said frame.*

*56. The system of claim 50 wherein said cartridge includes a resilient member for biasing said second cleaning component into engagement with said first cleaning component.*

*57. The system of claim 50 adapted to mount said second cleaning component above said first cleaning component such that gravity forces said first cleaning component against said media unit.*

*58. The system of claim 50 including mounting structures configured for quick installation in the system.*

*59. The system of claim 58 wherein said mounting structures include a latch.*

*60. The system of claim 50 wherein the total second contact surface area on said second cleaning component is greater than the total first contact surface area on said first cleaning component.*

*61. The system of claim 50 wherein said second cleaning component comprises a disposable tube having said second contact surface area and a core upon which said tube is mounted.*

*62. A printer or other system forming images on cards or other such media, comprising:*

*a. a chassis;*

*b. a media feed supported by said chassis; and*

*c. a replaceable media cleaning cartridge supported by said chassis and adapted to be received in the system, the cartridge being configured to support one or more cleaning components structured to engage and present to a moving media unit being cleaned a changing tacky contact surface area, wherein said cartridge comprises:*

*d. a first cleaning component structured and arranged to engage and present to the moving media unit being cleaned, a changing first contact surface area; and*

*e. a second cleaning component structured and arranged to engage and present to said first cleaning component, a changing second contact surface area.*

*63. The system of claim 62 wherein said cartridge is bidirectionally effective to receive a media unit on either of opposed first and second faces thereof.*

*64. The system of claim 62 wherein said cartridge and said chassis have mounting structures adapted for quick installation of the cartridge in the system.*

*65. The system of claim 64 wherein said mounting structures include a latch.*

*66. The system of claim 62 wherein said cartridge includes at least one upstanding tab adapted to be manually grasped for installation of the cartridge into the system.*

*67. The system of claim 66 wherein said cartridge includes an upstanding arm on each side of the cartridge.*

*68. The system of claim 67 wherein said arm is resilient and adapted to be flexed to facilitate installation of the cartridge in the system.*

*69. The system of claim 68 wherein said arms have detent provisions configured to cooperate with detent provisions in the chassis to position the cartridge in the system.*

*70. The system of claim 62 including alignment members on opposed sides of the cartridge configured to be received in cooperating alignment guides in the chassis.*

*71. The system of claim 70 wherein said alignment guides comprise slots.*

*72. The system of claim 62 wherein said cartridge has a pivoted lid.*

*73. The system of claim 72 wherein said cartridge includes a spring mounted to bias said lid to a closed position.*

*74. The system of claim 73 wherein second cleaning component comprises a roller having an axle, and wherein said lid engages said axle to bias said second cleaning component against said first cleaning component.*

*75. The system of claim 62 wherein said cartridge has a frame configured to define a media access opening on a first face of said cartridge.*

*76. The system of claim 75 wherein said opening comprises a window with at least one beveled edge.*

*77. The system of claim 75 wherein said cartridge is adapted to receive a media unit to be cleaned through said opening along an input path having a predetermined acute entry angle relative to horizontal.*

*78. The system of claim 77 wherein said acute entry angle is about 15 degrees.*

*79. The system of claim 78, wherein said cartridge defines a media exit opening on a second face of said cartridge having an exit angle that is substantially horizontal.*

*80. The system of claim 77 wherein said cartridge is adapted to eject a media unit which has been cleaned through said opening along an output path having a predetermined exit angle which is different than said entry angle relative to horizontal.*

*81. A media cleaning method, comprising:*

*a. providing a printer or other media image-forming system;*

*b. providing a cleaning cartridge for said system, comprising:*

*i. a first cleaning component structured and arranged to engage and present to a moving media unit being cleaned a changing first contact surface area; and*

*ii. a second cleaning component structured and arranged to engage and present to said first cleaning component a changing second contact surface area;*

*iii. the tackiness of said second contact surface area being greater than the tackiness of said first contact surface area which in turn is greater than the tackiness of a media unit such that said first contact surface area adhesively attracts particles from a media unit being cleaned and said second contact surface area adhesively attracts particles from said first surface area;*

*iv. installing the cartridge in the system;*

*c. moving media through said system until the effectiveness of said second cleaning component in cleaning media has diminished;*

*d. withdrawing said cartridge from said system; and*

*e. replacing said second cleaning component.*

*82. A printer or other system forming images on cards or other such media adapted for use with a replaceable media cleaning cartridge, the system comprising:*

*a. a media feed; and*

*b. a system chassis mounting the media feed and configured to receive and support a cartridge adjacent the feed such that a media unit being cleaned is transported by the feed in contact with the cartridge,*

*c. the system chassis having spaced guides structured to guide and at least assist in retaining the cartridge on the system chassis,*

*wherein said guides comprise slots.*

*83. The system of claim 82, wherein said guides are located on opposed walls of the system chassis.*

*84. The system of claim 83 wherein said guides comprise channels adapted to engage opposed sides of a cartridge and guide it into an operative position within the system.*

*85. The system of claim 84 wherein said channels are formed by projections from said opposed walls in said system chassis.*

*86. The system of claim 82 wherein said system chassis has at least one detent provision adapted to cause said cartridge to snap into said system chassis when the cartridge is located in its operative position.*

*87. A printer or other system forming images on cards or other such media having a snap-in media cleaning cartridge, comprising:*

*a. a media cleaning cartridge configured to support one or more cleaning components and structured to engage and present to a moving media unit being cleaned a changing tacky contact surface area;*

*b. a media feed; and*

*c. a system chassis mounting the media feed and configured to receive and support the cartridge in an operative position adjacent the feed;*

*d. the system chassis and the cartridge having cooperative cartridge retention provisions structured to cause said cartridge to snap into said operative position, wherein said cartridge has flexible arms on opposed sides which cooperate with channels or slots on opposed walls of said system chassis during installation of said cartridge in said system chassis.*

*88. The system of claim 87 wherein said cartridge arms and said chassis channels or slots include a detent arrangement.*

*89. The system of claim 87 wherein said cartridge retention provisions include a detent.*

*90. The system of claim 87 wherein said cartridge retention provisions include one or more resilient members constituting part of the cartridge, and wherein said one or more resilient members are manually stressed during installation of the cartridge to contribute to the snap-in effect.*

*91. For use with a media cleaning cartridge for a printer or other system forming images on cards or other such media, the media cleaning cartridge having a first cleaning component structured to engage and present to a moving media unit being cleaned a changing first contact surface area, a second cleaning component comprising:*

*a. a changing second contact surface area configured and arranged to engage said first contact surface area of said first cleaning component,*

*b. the tackiness of said second contact surface area being greater than the tackiness of said first contact surface area which in turn is greater than the tackiness of a media unit being cleaned such that said first contact surface area adhesively attracts particles from said media unit and said second contact surface area adhesively attracts particles from said first surface area,*

*c. said second cleaning component being structured to be readily removed from said cartridge and discarded when the tackiness of said second contact surface area is no longer capable of efficiently adhesively attracting particles from said first contact surface area on said first cleaning component.*

*92. The second cleaning component of claim 91 comprising a tube having removable end caps.*

*93. The second cleaning component of claim 92 wherein said end caps have journals adapted to be received in open-ended slots in a cartridge frame.*

*94. The second cleaning component of claim 91 configured as a roller.*

*95. A printer or other system forming images on cards or other such media, comprising:*

*a. a chassis;*

*b. a media feed supported by said chassis; and*

*c. a media cleaner supported by said chassis and positioned adjacent the media feed, said media cleaner comprising:*

*i. a first cleaning component structured and arranged to engage and present to a moving media unit being cleaned a changing first contact surface area; and*

*ii. a second cleaning component supported above said first cleaning component and resting under the force of gravity on said first cleaning component, said second cleaning component being structured and arranged to engage and present to said first cleaning component a changing second contact surface area;*

*iii. the tackiness of said second contact surface area being greater than the tackiness of said first contact surface area which in turn is greater than the tackiness of a media unit such that said first contact surface area adhesively attracts particles from a media unit being cleaned and said second contact surface area adhesively attracts particles from said first surface area.*

*96. The system of claim 95 wherein said first cleaning component comprises a roller.*

*97. The system of claim 95 wherein said second cleaning component comprises a roller.*

*98. The system of claim 95 wherein said second cleaning component is structured for quick removal from the system.*

*99. The system of claim 95 wherein said second cleaning component is adapted to be disposable.*

*100. The system of claim 95 wherein said media cleaner has a frame which supports said first and second cleaning components, said frame being configured such that at least said second cleaning component is held in slots in said frame.*

*101. The system of claim 95 including a resilient member configured to bias said second cleaning component against said first cleaning component.*

*102. The media cleaner of claim 95 wherein the total second contact surface area on said second cleaning component is greater than the total first contact surface area on said first cleaning component.*

*103. The system of claim 95 wherein said second cleaning component comprises a disposable tube having externally said second surface area and a core upon which said tube is mounted.*

*104. The system of claim 103 wherein said core comprising a pair of end caps which fit into the ends of the tube.*

* * * * *